United States Patent
Kitamura et al.

(10) Patent No.: US 11,557,794 B2
(45) Date of Patent: Jan. 17, 2023

(54) SOLID-STATE BATTERY AND METHOD OF MANUFACTURE THEREOF

(71) Applicant: Panasonic Intellectual Property Management Co., Ltd., Osaka (JP)

(72) Inventors: Yoshiro Kitamura, Osaka (JP); Katsuji Sumimoto, Nara (JP); Masahiro Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 567 days.

(21) Appl. No.: 16/704,357

(22) Filed: Dec. 5, 2019

(65) Prior Publication Data
US 2020/0212497 A1    Jul. 2, 2020

(30) Foreign Application Priority Data
Dec. 27, 2018    (JP) .............. JP2018-246058

(51) Int. Cl.
*H01M 10/0585* (2010.01)
*H01M 10/0525* (2010.01)
(Continued)

(52) U.S. Cl.
CPC ......... *H01M 10/0585* (2013.01); *B32B 37/18* (2013.01); *B32B 38/0004* (2013.01);
(Continued)

(58) Field of Classification Search
CPC . B32B 2309/06; B32B 2457/10; B32B 37/18; B32B 38/0004; B32B 38/0008;
(Continued)

(56) References Cited

U.S. PATENT DOCUMENTS

2007/0042265 A1* 2/2007 Tamai .............. H01M 10/0562
                                                                  264/618
2016/0260978 A1    9/2016 Fujii
(Continued)

FOREIGN PATENT DOCUMENTS

| JP | 2014-127463 | 7/2014 |
| JP | 2015-050153 | 3/2015 |

(Continued)

*Primary Examiner* — Philip C Tucker
*Assistant Examiner* — Brian R Slawski
(74) *Attorney, Agent, or Firm* — Wenderoth, Lind & Ponack, L.L.P.

(57) ABSTRACT

Provided herein is a solid-state battery having high volume energy density, as well as a method of manufacture of such a solid-state battery. A solid-state battery 100 is a laminate including a first collector layer 1, a positive electrode layer 2, a solid electrolyte layer 5, a negative electrode layer 4, and a second collector layer 3, in this order from the top. The solid-state battery 100 satisfies $\alpha > 90°$, $\beta > 90°$, and $\alpha > \beta$, where $\alpha$ is the angle formed in the positive electrode layer 2 by a side surface 2A of the positive electrode layer 2 and the top surface of the solid electrolyte layer 5 underlying the positive electrode layer 2, and $\beta$ is the angle formed in the negative electrode layer 4 by a side surface 4A of the negative electrode layer 4 and the top surface of the second collector layer 3 underlying the negative electrode layer 4.

9 Claims, 11 Drawing Sheets

(51) Int. Cl.
*B32B 37/18* (2006.01)
*B32B 38/00* (2006.01)

(52) U.S. Cl.
CPC ..... *B32B 38/0008* (2013.01); *H01M 10/0525* (2013.01); *B32B 2309/06* (2013.01); *B32B 2457/10* (2013.01)

(58) Field of Classification Search
CPC ......... H01M 10/0525; H01M 10/0562; H01M 10/058; H01M 10/0585; H01M 10/02; Y02E 60/10; Y02P 70/50
USPC ........... 156/60, 242, 244.11, 244.18, 244.19, 156/244.24, 250, 267, 272.2, 272.8; 429/122, 162, 188, 304, 209, 231.95
See application file for complete search history.

(56) References Cited

U.S. PATENT DOCUMENTS

| | | |
|---|---|---|
| 2016/0294015 A1 | 10/2016 | Tanaka et al. |
| 2018/0198169 A1 | 7/2018 | Fukui et al. |
| 2018/0277816 A1 | 9/2018 | Minagata et al. |

FOREIGN PATENT DOCUMENTS

| | | |
|---|---|---|
| JP | 2017-010786 | 1/2017 |
| WO | 2015/064586 | 5/2015 |
| WO | 2015/087657 | 6/2015 |
| WO | 2017/072898 | 5/2017 |

\* cited by examiner

SOLID-STATE BATTERY AND METHOD OF MANUFACTURE THEREOF

TECHNICAL FIELD

The present disclosure relates to solid-state batteries and methods for manufacturing solid-state batteries. Particularly, the present disclosure relates to a solid-state battery that includes a positive electrode layer, a negative electrode layer, and a solid electrolyte layer, and to a method for manufacturing such a solid-state battery.

BACKGROUND

In recent years, electronic devices such as personal computers and smartphones have been becoming light and cordless, and due to these features, development of repeatedly reusable secondary batteries have been desired. Examples of secondary batteries include nickel cadmium batteries, nickel-hydrogen batteries, lead-acid batteries, and lithium-ion batteries. Among these, the lithium-ion batteries have been attracting attention because of characteristics such as light weight, high voltage, and high energy density. Development of a high-capacity secondary battery is regarded as important also in the field of automobiles such as electric vehicles and hybrid vehicles, and there has been more and more demand for lithium-ion batteries.

A lithium-ion battery includes a positive electrode layer, a negative electrode layer, and an electrolyte disposed between these electrode layers. The electrolyte is, for example, an electrolytic solution prepared by dissolving a supporting electrolyte, such as lithium hexafluorophosphate, in an organic solvent. A solid electrolyte can also be used. Lithium-ion batteries that are currently in wide use are flammable since the electrolytic solution used in these batteries contains an organic solvent. Materials, structures, and systems are therefore needed to ensure the safety of lithium-ion batteries. It is expected that the materials, structures, and systems needed for lithium-ion batteries can be simplified by using a nonflammable solid electrolyte as the electrolyte. In addition, it is considered that using a solid electrolyte makes it possible to increase energy density, reduce manufacturing costs, and improve productivity. Hereinafter, a battery using a solid electrolyte will be referred to as "solid-state battery".

Solid electrolytes can be broadly classified into organic solid electrolytes and inorganic solid electrolytes. An organic solid electrolyte has an ion conductivity of about $10^{-6}$ S/cm at 25° C., which is much lower than the ion conductivity of an electrolytic solution of about $10^{-3}$ S/cm. It is accordingly difficult for a solid-state battery using an organic solid electrolyte to operate at a temperature of 25° C. Inorganic solid electrolytes include oxide solid electrolytes and sulfide solid electrolytes. These have a relatively high ion conductivity of about $10^{-4}$ to $10^{-3}$ S/cm. Oxide solid electrolytes have high grain boundary resistivities, and there have been efforts to decrease grain boundary resistivity by sintering of a powder or by reducing thickness of a film. However, sintering of a powder involves high temperature and causes the constituent elements of the positive or negative electrode to interdiffuse with the constituent elements of the solid electrolyte. This makes it difficult to obtain sufficient characteristics. The approach has therefore shifted to reducing the thickness of solid-state batteries that use oxide solid electrolytes. On the other hand, sulfide solid electrolytes have lower grain boundary resistivities than oxide solid electrolytes, and desirable characteristics can be achieved simply by compression molding of a powder. Due to this, sulfide solid electrolytes have been actively studied over the last years.

A coating-type solid-state battery includes: a positive electrode layer formed on a collector formed of a metal foil, and containing a positive-electrode active material, a solid electrolyte, and a binder; a negative electrode layer formed on a collector formed of a metal foil, and containing a negative-electrode active material, a solid electrolyte, and a binder; and a solid electrolyte layer disposed between the positive electrode layer and the negative electrode layer and containing a solid electrolyte and a binder. A coating-type solid-state battery is produced by preparing a slurry of each of a positive electrode layer material, a negative electrode layer material, and a solid electrolyte layer material using an organic solvent, and depositing the slurry on a metal foil. In the production of a solid-state battery, shorting among the positive electrode layer, the negative electrode layer, and the collectors should be restrained to achieve high battery reliability.

There is also a demand for lightweight secondary batteries with high capacity, including solid-state batteries, and volume energy density [Wh/L] is used as an evaluation index. Volume energy density is influenced by the shape and size of a solid-state battery.

JP-A-2015-50153 discloses a structure having a shape in which, as shown in FIG. 11, at least one surface of a laminate 600 for solid-state batteries is chamfered (the angle ε in FIG. 11 is less than 90°), where the laminate 600 has a laminated structure of a positive-electrode active material layer 601, a solid electrolyte layer 602, and a negative-electrode active material layer 603.

The laminate for solid-state batteries disclosed in the foregoing related art is intended to prevent shorting due to deformation or detachment of electrode layers. For this purpose, at least one surface of the laminated structure for solid-state batteries is chamfered, where, in the laminated structure, a positive-electrode active material layer, a solid electrolyte layer, and a negative-electrode active material layer are laminated. However, this related art does not mention the shape and size of the positive-electrode active material layer, the solid electrolyte, the negative-electrode active material layer, and the collectors, in relation to each other. Conceivably, the solid-state battery of the related art cannot have improved volume energy density with this structure.

SUMMARY

The present disclosure has been made according to the above mentioned circumstances, and it is an object of the present disclosure to provide a solid-state battery having high volume energy density, and a method for manufacturing such a solid-state battery.

According to an aspect of the present disclosure, there is provided a solid-state battery comprising a laminate that includes a first collector layer, a first electrode layer, a solid electrolyte layer, a second electrode layer, and a second collector layer, in this order from the top, one of the first electrode layer and the second electrode layer being a positive electrode layer while the other is a negative electrode layer, the solid-state battery satisfying $\alpha > 90°$, $\beta > 90°$, and $\alpha > \beta$, wherein:

$\alpha$ is an angle formed in the positive electrode layer by a side surface of the positive electrode layer and a surface in contact with the positive electrode layer of a layer underlying the positive electrode layer, and β is an angle formed in the negative electrode layer by a side surface of the negative electrode layer and a surface in contact with the negative electrode layer of a layer underlying the negative electrode layer.

A solid-state battery according to another aspect of the present disclosure is a solid-state battery comprising a laminate that includes a first collector layer, a first electrode layer, a solid electrolyte layer, a second electrode layer, and a second collector layer, in this order from the top, one of the first electrode layer and the second electrode layer being a positive electrode layer while the other is a negative electrode layer, the solid-state battery satisfying α>90°, β>90°, γ>90°, δ≥90°, and α+γ>β+δ, wherein:

α is an angle formed in the positive electrode layer by a side surface of the positive electrode layer and a surface in contact with the positive electrode layer of a layer underlying the positive electrode layer, β is an angle formed in the negative electrode layer by a side surface of the negative electrode layer and a surface in contact with the negative electrode layer of a layer underlying the negative electrode layer, γ is an angle formed in the positive electrode layer by a side surface of the positive electrode layer and a surface in contact with the positive electrode layer of a layer overlying the positive electrode layer, and δ is an angle formed in the negative electrode layer by a side surface of the negative electrode layer and a surface in contact with the negative electrode layer of a layer overlying the negative electrode layer.

A solid-state battery manufacturing method according to an aspect of the present disclosure is a method that comprises:

a laminate forming step of forming a laminated structure that includes a first collector layer, a first electrode layer, a solid electrolyte layer, a second electrode layer, and a second collector layer in this order from the top; and a laser cutting step of cutting the laminated structure into a predetermined size and shape using a laser beam, one of the first electrode layer and the second electrode layer being a positive electrode layer while the other is a negative electrode layer, in the laser cutting step, the laminated structure being cut so as to satisfy α>90°, β>90°, and α>β, wherein:

α is an angle formed in the positive electrode layer by a side surface of the positive electrode layer and a surface in contact with the positive electrode layer of a layer underlying the positive electrode layer, and β is an angle formed in the negative electrode layer by a side surface of the negative electrode layer and a surface in contact with the negative electrode layer of a layer underlying the negative electrode layer.

A solid-state battery manufacturing method according to another aspect of the present disclosure is a method that comprises:

a laminate forming step of forming a laminated structure that includes a first collector layer, a first electrode layer, a solid electrolyte layer, a second electrode layer, and a second collector layer in this order from the top; and a laser cutting step of cutting the laminated structure into a predetermined size and shape using a laser beam, one of the first electrode layer and the second electrode layer being a positive electrode layer while the other is a negative electrode layer, in the laser cutting step, the laminated structure being cut so as to satisfy α>90°, β>90°, γ>90°, δ≥90°, and α+γ>β+δ, wherein:

α is an angle formed in the positive electrode layer by a side surface of the positive electrode layer and a surface in contact with the positive electrode layer of a layer underlying the positive electrode layer, β is an angle formed in the negative electrode layer by a side surface of the negative electrode layer and a surface in contact with the negative electrode layer of a layer underlying the negative electrode layer, γ is an angle formed in the positive electrode layer by a side surface of the positive electrode layer and a surface in contact with the positive electrode layer of a layer overlying the positive electrode layer, and δ is an angle formed in the negative electrode layer by a side surface of the negative electrode layer and a surface in contact with the negative electrode layer of a layer overlying the negative electrode layer.

The present disclosure can therefore provide a solid-state battery having high volume energy density, and a method for manufacturing such a solid-state battery.

DESCRIPTION OF EMBODIMENTS

Figure 1:
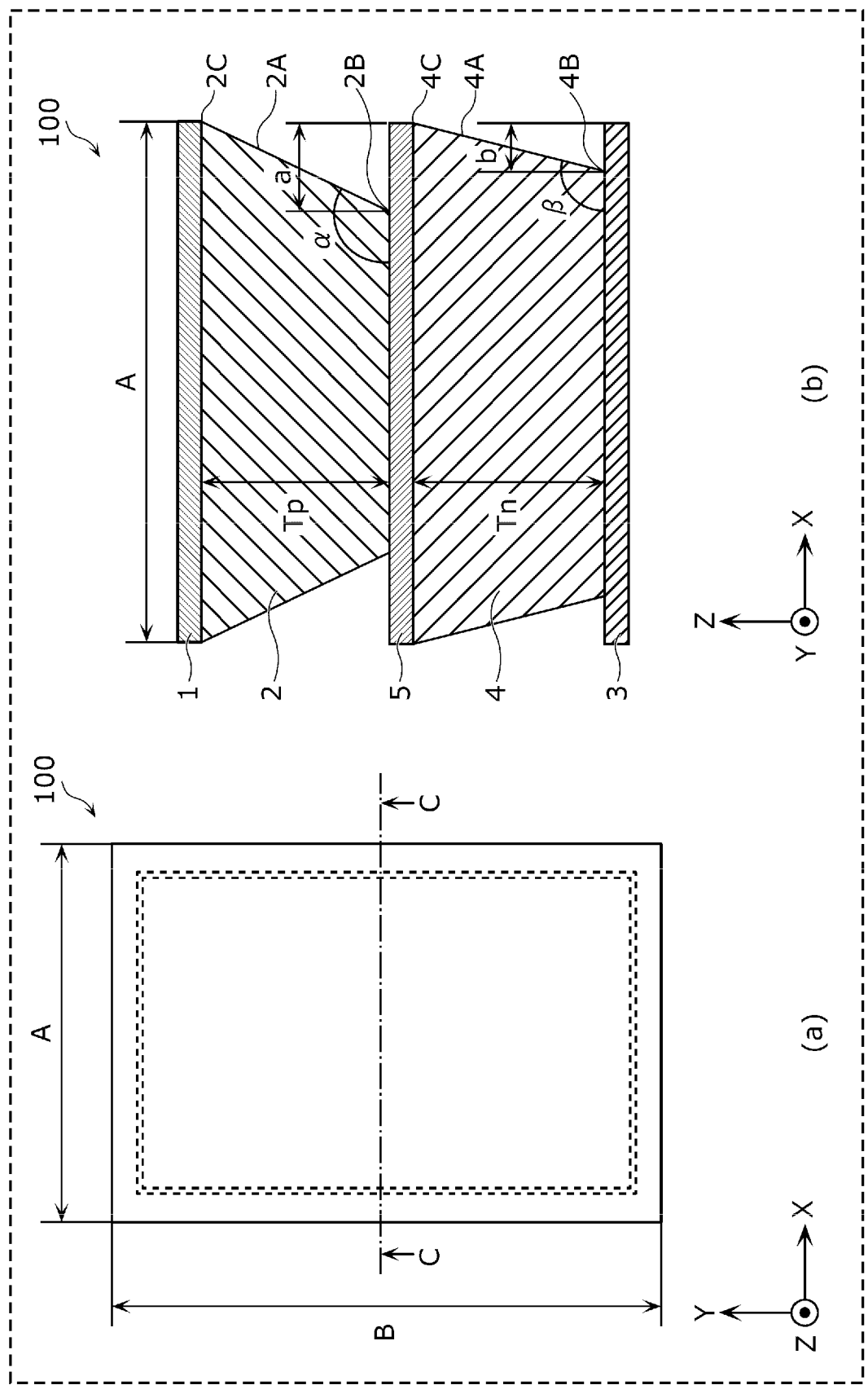
FIG. 1 is a schematic view showing a solid-state battery of First Embodiment of the present disclosure.

A solid-state battery has a non-functional region, which is an about 2- to 3-mm region of battery from the side surface of the positive or negative electrode layer to the side surface of the collector on each side of battery. Such a non-functional region is provided to prevent shorting between the positive electrode layer, the negative electrode layer, and the collector, and to ensure size accuracy when applying a slurry in manufacture of a coating-type solid-state battery among solid-state batteries. The non-functional region is a factor responsible for decrease in volume energy density, and should be reduced in size as much as possible, or, ideally, not exist at all.

The present disclosure is intended to provide a solid-state battery having high volume energy density, and a method for manufacturing such a solid-state battery. Particularly, in the present disclosure, a solid-state battery having high volume energy density is provided by reducing the non-functional region while reducing shorting. A method for manufacturing such a solid-state battery is also provided.

A solid-state battery according to an aspect of the present disclosure is a solid-state battery comprising a laminate that includes a first collector layer, a first electrode layer, a solid electrolyte layer, a second electrode layer, and a second collector layer, in this order from the top, one of the first electrode layer and the second electrode layer being a positive electrode layer while the other is a negative electrode layer, the solid-state battery satisfying $\alpha > 90°$, $\beta > 90°$, and $\alpha > \beta$, wherein:

$\alpha$ is an angle formed in the positive electrode layer by a side surface of the positive electrode layer and a surface in contact with the positive electrode layer of a layer underlying the positive electrode layer, and $\beta$ is an angle formed in the negative electrode layer by a side surface of the negative electrode layer and a surface in contact with the negative electrode layer of a layer underlying the negative electrode layer.

Specifically, when the first electrode layer is a positive electrode layer and the second electrode layer is a negative electrode layer, the solid-state battery satisfies $\alpha > 90°$, $\beta > 90°$, and $\alpha > \beta$, wherein:

$\alpha$ is an angle formed in the positive electrode layer by a side surface of the positive electrode layer and the top surface of the solid electrolyte layer underlying the positive electrode layer, and $\beta$ is an angle formed in the negative electrode layer by a side surface of the negative electrode layer and the top surface of the second collector layer underlying the negative electrode layer.

When the first electrode layer is a negative electrode layer and the second electrode layer is a positive electrode layer, the solid-state battery satisfies $\alpha > 90°$, $\beta > 90°$, and $\alpha > \beta$, wherein:

$\alpha$ is an angle formed in the positive electrode layer by a side surface of the positive electrode layer and the top surface of the second collector layer underlying the positive electrode layer, and $\beta$ is an angle formed in the negative electrode layer by a side surface of the negative electrode layer and the top surface of the solid electrolyte layer underlying the negative electrode layer.

With $\alpha > \beta$, the negative electrode layer, which accepts metal ions, can have a higher volume than the positive electrode layer, and the metal ions present in the positive electrode layer become less likely to precipitate as metal on the negative electrode layer. In this way, shorting due to precipitation of metals can be reduced. Due to $\alpha > 90°$, the positive electrode layer has an inwardly sloped side surface toward the bottom. This produces a structure in which the positive electrode layer, when provided above the negative electrode layer, does not easily come in contact with the negative electrode layer, even when the side surfaces of the negative electrode layer and the positive electrode layer are, for example, cut with a laser to reduce the size of non-functional region. This makes it possible to reduce shorting between the positive electrode layer and the negative electrode layer due to a reduced non-functional region. Since shorting is reduced, the resulting solid-state battery is highly reliable, and, with a reduced non-functional region, can have high volume energy density. Due to $\beta > 90°$, the negative electrode layer has an inwardly sloped side surface toward the bottom. This produces a structure in which the negative electrode layer, when provided above the positive electrode layer, does not easily come in contact with the positive electrode layer. This makes it possible to reduce shorting between the positive electrode layer and the negative electrode layer.

In the solid-state battery, for example, when viewed along a direction of lamination, a contact portion where the side surface of the negative electrode layer meets the layer underlying the negative electrode layer may lie outside of a contact portion where the side surface of the positive electrode layer meets the layer underlying the positive electrode layer. That is, in a case where the first electrode layer is a positive electrode layer and the second electrode layer is a negative electrode layer, the solid-state battery may be structured so that a contact portion where the side surface of the negative electrode layer meets the second collector layer underlying the negative electrode layer lies outside of a contact portion where the side surface of the positive electrode layer meets the solid electrolyte layer underlying the positive electrode layer, when viewed along a direction of lamination. When the first electrode layer is a negative electrode layer and the second electrode layer is a positive electrode layer, the solid-state battery may be structured so that a contact portion where the side surface of the negative electrode layer meets the solid electrolyte layer underlying the negative electrode layer lies outside of a contact portion where the side surface of the positive electrode layer meets the second collector layer underlying the positive electrode layer, when viewed along a direction of lamination.

In the structure in which the contact portion where the side surface of the positive electrode layer meets the layer directly below the positive electrode layer is more inwardly disposed, the positive electrode layer becomes even less likely to contact the negative electrode layer, particularly when the negative electrode layer is disposed below the positive electrode layer. This makes it possible to reduce shorting between the positive electrode layer and the negative electrode layer.

The solid-state battery may satisfy, for example, $\gamma > 90°$, $\delta \geq 90°$, and $\gamma > \delta$, wherein:

$\gamma$ is an angle formed in the positive electrode layer by a side surface of the positive electrode layer and a surface in contact with the positive electrode layer of a layer overlying the positive electrode layer, and $\delta$ is an angle formed in the negative electrode layer by a side surface of the negative electrode layer and a surface in contact with the negative electrode layer of a layer overlying the negative electrode layer.

That is, when the first electrode layer is a positive electrode layer and the second electrode layer is a negative electrode layer, the solid-state battery may satisfy $\gamma > 90°$, $\delta \geq 90°$, and $\gamma > \delta$, wherein:

$\gamma$ is an angle formed in the positive electrode layer by a side surface of the positive electrode layer and the bottom surface of the first collector layer overlying the positive electrode layer, and $\delta$ is an angle formed in the negative electrode layer by a side surface of the negative electrode layer and the bottom surface of the solid electrolyte layer overlying the negative electrode layer.

When the first electrode layer is a negative electrode layer and the second electrode layer is a positive electrode layer, the solid-state battery may satisfy $\gamma>90°$, $\delta\geq90°$, and $\gamma>\delta$, wherein:

$\gamma$ is an angle formed in the positive electrode layer by a side surface of the positive electrode layer and the bottom surface of the solid electrolyte layer overlying the positive electrode layer, and $\delta$ is an angle formed in the negative electrode layer by a side surface of the negative electrode layer and the bottom surface of the first collector layer overlying the negative electrode layer.

With $\gamma>\delta$, the negative electrode layer, which accepts metal ions, can have an even higher volume than the positive electrode layer, and the metal ions present in the positive electrode layer become less likely to precipitate as metal on the negative electrode layer. In this way, shorting due to precipitation of metals can be reduced. Due to $\gamma>90°$, the positive electrode layer has an inwardly sloped side surface toward the top. This produces a structure in which the positive electrode layer becomes even less likely to come in contact with the negative electrode layer, particularly when the negative electrode layer is disposed above the positive electrode layer. This makes it possible to reduce shorting between the positive electrode layer and the negative electrode layer.

A solid-state battery according to another aspect of the present disclosure is a solid-state battery comprising a laminate that includes a first collector layer, a first electrode layer, a solid electrolyte layer, a second electrode layer, and a second collector layer, in this order from the top, one of the first electrode layer and the second electrode layer being a positive electrode layer while the other is a negative electrode layer, the solid-state battery satisfying $\alpha>90°$, $\beta>90°$, $\gamma>90°$, $\delta\geq90°$, and $\alpha+\gamma>\beta+\delta$, wherein:

$\alpha$ is an angle formed in the positive electrode layer by a side surface of the positive electrode layer and a surface in contact with the positive electrode layer of a layer underlying the positive electrode layer, $\beta$ is an angle formed in the negative electrode layer by a side surface of the negative electrode layer and a surface in contact with the negative electrode layer of a layer underlying the negative electrode layer, $\gamma$ is an angle formed in the positive electrode layer by a side surface of the positive electrode layer and a surface in contact with the positive electrode layer of a layer overlying the positive electrode layer, and $\delta$ is an angle formed in the negative electrode layer by a side surface of the negative electrode layer and a surface in contact with the negative electrode layer of a layer overlying the negative electrode layer.

That is, when the first electrode layer is a positive electrode layer and the second electrode layer is a negative electrode layer, the solid-state battery satisfies $\alpha>90°$, $\beta>90°$, $\gamma>90°$, $\delta\geq90°$, and $\alpha+\gamma>\beta+\delta$, wherein:

$\alpha$ is an angle formed in the positive electrode layer by a side surface of the positive electrode layer and the top surface of the solid electrolyte layer underlying the positive electrode layer, $\beta$ is an angle formed in the negative electrode layer by a side surface of the negative electrode layer and the top surface of the second collector layer underlying the negative electrode layer, $\gamma$ is an angle formed in the positive electrode layer by a side surface of the positive electrode layer and the bottom surface of the first collector layer overlying the positive electrode layer, and $\delta$ is an angle formed in the negative electrode layer by a side surface of the negative electrode layer and the bottom surface of the solid electrolyte layer overlying the negative electrode layer.

When the first electrode layer is a negative electrode layer and the second electrode layer is a positive electrode layer, the solid-state battery satisfies $\alpha>90°$, $\beta>90°$, $\gamma>90°$, $\delta\geq90°$, and $\alpha+\gamma>\beta+\delta$, wherein:

$\alpha$ is an angle formed in the positive electrode layer by a side surface of the positive electrode layer and the top surface of the second collector layer underlying the positive electrode layer, $\beta$ is an angle formed in the negative electrode layer by a side surface of the negative electrode layer and the top surface of the solid electrolyte layer underlying the negative electrode layer, $\gamma$ is an angle formed in the positive electrode layer by a side surface of the positive electrode layer and the bottom surface of the solid electrolyte layer overlying the positive electrode layer, and $\delta$ is an angle formed in the negative electrode layer by a side surface of the negative electrode layer and the bottom surface of the first collector layer overlying the negative electrode layer.

With $\alpha+\gamma>\beta+\delta$, the negative electrode layer, which accepts metal ions, can have a higher volume than the positive electrode layer, and the metal ions present in the positive electrode layer become less likely to precipitate as metal on the negative electrode layer. In this way, shorting due to precipitation of metals can be reduced. Due to $\alpha>90°$ and $\gamma>90°$, the positive electrode layer has inwardly sloped side surfaces toward the top and toward the bottom. This produces a structure in which the positive electrode layer, when provided above or below the negative electrode layer, does not easily come in contact with the negative electrode layer, even when the side surfaces of the negative electrode layer and the positive electrode layer are, for example, cut with a laser to reduce the size of non-functional region. This makes it possible to reduce shorting between the positive electrode layer and the negative electrode layer due to a reduced non-functional region. Since shorting is reduced, the resulting solid-state battery is highly reliable, and, with a reduced non-functional region, can have high volume energy density. Further, due to $\beta>90°$, the negative electrode layer has an inwardly sloped side surface toward the bottom. This produces a structure in which the negative electrode layer, when provided above the positive electrode layer, does not easily come in contact with the positive electrode layer. This makes it possible to reduce shorting between the positive electrode layer and the negative electrode layer.

In the solid-state battery, for example, when viewed along a direction of lamination, a contact portion where the side surface of the negative electrode layer meets the first collector layer or the solid electrolyte layer overlying the negative electrode layer may lie outside of a contact portion where the side surface of the positive electrode layer meets the layer overlying the positive electrode layer. That is, in a case where the first electrode layer is a positive electrode layer and the second electrode layer is a negative electrode layer, the solid-state battery may be structured so that a contact portion where the side surface of the negative electrode layer meets the solid electrolyte layer overlying the negative electrode layer lies outside of a contact portion where the side surface of the positive electrode layer meets the first collector layer overlying the positive electrode layer, when viewed along a direction of lamination. In a case where the first electrode layer is a negative electrode layer and the second electrode layer is a positive electrode layer, the solid-state battery may be structured so that a contact portion where the side surface of the negative electrode layer meets the first collector layer overlying the negative electrode layer lies outside of a contact portion where the side surface of the positive electrode layer meets the solid electrolyte layer overlying the positive electrode layer, when viewed along a direction of lamination.

In the structure in which the contact portion where the side surface of the positive electrode layer meets the layer directly above the positive electrode layer is more inwardly disposed, the positive electrode layer becomes even less likely to come in contact with the negative electrode layer, particularly when the negative electrode layer is disposed above the positive electrode layer. This makes it possible to reduce shorting between the positive electrode layer and the negative electrode layer.

In the solid-state battery, for example, when viewed along a direction of lamination the contact portion where the side surface of the negative electrode layer meets the layer underlying the negative electrode layer, and the contact portion where the side surface of the negative electrode layer meets the layer overlying the negative electrode layer may both lie outside of the contact portion where the side surface of the positive electrode layer meets the layer underlying the positive electrode layer, and the contact portion where the side surface of the positive electrode layer meets the layer overlying the positive electrode layer. That is, in a case where the first electrode layer is a positive electrode layer and the second electrode layer is a negative electrode layer, the solid-state battery may be configured so that the contact portion where the side surface of the negative electrode layer meets the second collector layer underlying the negative electrode layer, and the contact portion where the side surface of the negative electrode layer meets the solid electrolyte layer overlying the negative electrode layer both lie outside of the contact portion where the side surface of the positive electrode layer meets the solid electrolyte layer underlying the positive electrode layer, and the contact portion where the side surface of the positive electrode layer meets the first collector layer overlying the positive electrode layer, when viewed along a direction of lamination. In a case where the first electrode layer is a negative electrode layer and the second electrode layer is a positive electrode layer, the solid-state battery may be configured so that the contact portion where the side surface of the negative electrode layer meets the solid electrolyte layer underlying the negative electrode layer, and the contact portion where the side surface of the negative electrode layer meets the first collector layer overlying the negative electrode layer both lie outside of the contact portion where the side surface of the positive electrode layer meets the second collector layer underlying the positive electrode layer, and the contact portion where the side surface of the positive electrode layer meets the solid electrolyte layer overlying the positive electrode layer, when viewed along a direction of lamination.

In this structure, the contact portion where the side surface of the positive electrode layer meets the layer directly above the positive electrode layer, and the contact portion where the side surface of the positive electrode layer meets the layer directly below the positive electrode layer are more inwardly disposed. In this way, the positive electrode layer becomes even less likely to come in contact with the negative electrode layer, regardless of whether the negative electrode layer is disposed above or below the positive electrode layer, making it possible to reduce shorting between the positive electrode layer and the negative electrode layer.

In the solid-state battery, for example, when viewed along a direction of lamination, the outermost portion of the side surface of the negative electrode layer may lie outside of the outermost portion of the side surface of the positive electrode layer.

In this way, the negative electrode layer, which accepts metal ions, can have an even higher volume than the positive electrode layer, and the metal ions present in the positive electrode layer become even less likely to precipitate as metal on the negative electrode layer, making it possible to reduce shorting due to precipitation of metals.

The solid-state battery may satisfy $\delta > 90°$, for example.

With $\delta > 90°$, the negative electrode layer has an inwardly sloped side surface toward the top. In this way, the negative electrode layer becomes less likely to come in contact with the positive electrode layer, particularly when the positive electrode layer is disposed above the negative electrode layer, making it possible to reduce shorting between the positive electrode layer and the negative electrode layer.

In the solid-state battery, for example, when viewed along a direction of lamination, the side surface of the first collector layer, the side surface of the second collector layer, and the outermost portion of the side surface of a laminated structure of the first electrode layer, the second electrode layer, and the solid electrolyte layer may overlie one another.

In this way, since these layers overlap in planar view, the solid-state battery can be housed in a casing with only a small non-functional region, if any, and can have high volume energy density.

In the solid-state battery, for example, the first electrode layer may be the positive electrode layer, and the second electrode layer may be the negative electrode layer.

In this structure, the negative electrode layer is disposed below the positive electrode layer, and the positive electrode layer is unlikely to come in contact with the negative electrode layer, making it possible to reduce shorting between the positive electrode layer and the negative electrode layer.

In the solid-state battery, for example, the first electrode layer may be the negative electrode layer, and the second electrode layer may be the positive electrode layer.

In this case, in a structure formed by stacking the solid-state batteries, the negative electrode layer is situated below the positive electrode layer, and the positive electrode layer is unlikely to come in contact with the negative electrode layer. This makes it possible to reduce shorting between the positive electrode layer and the negative electrode layer.

A solid-state battery manufacturing method of an aspect of the present disclosure comprises:

a laminate forming step of forming a laminated structure that includes a first collector layer, a first electrode layer, a solid electrolyte layer, a second electrode layer, and a second collector layer in this order from the top; and a laser cutting step of cutting the laminated structure into a predetermined size and shape using a laser beam, one of the first electrode layer and the second electrode layer being a positive electrode layer while the other is a negative electrode layer, in the laser cutting step, the laminated structure being cut so as to satisfy $\alpha > 90°$, $\beta > 90°$, and $\alpha > \beta$, wherein:

α is an angle formed in the positive electrode layer by a side surface of the positive electrode layer and a surface in contact with the positive electrode layer of a layer underlying the positive electrode layer, and β is an angle formed in the negative electrode layer by a side surface of the negative electrode layer and a surface in contact with the negative electrode layer of a layer underlying the negative electrode layer.

Since a laser beam is used to cut the laminated structure, the laminated structure can be cut into a shape that cannot be easily achievable by common mechanical cutting. Also, since the cut shape satisfies $\alpha > \beta$, the negative electrode layer, which accepts metal ions, can have a higher volume than the positive electrode layer, and the metal ions present in the positive electrode layer become less likely to precipitate as metal on the negative electrode layer, making it possible to reduce shorting due to precipitation of metals. Since the cut shape satisfies $\alpha > 90°$, the positive electrode layer has an inwardly sloped side surface toward the bottom. In this structure, the positive electrode layer, when disposed above the negative electrode layer, becomes less likely to come in contact with the negative electrode layer, and a solid-state battery can be manufactured in a way that shorting between the positive electrode layer and a negative electrode layer due to a reduced non-functional region can be reduced. It is accordingly possible to efficiently manufacture a solid-state battery that is highly reliable, and that, with a reduced non-functional region, has high volume energy density.

Further, since the cut shape satisfies $\beta > 90°$, the negative electrode layer has an inwardly sloped side surface toward the bottom. In this structure, the negative electrode layer, when disposed above the positive electrode layer, becomes less likely to come in contact with the positive electrode layer, and shorting between the positive electrode layer and the negative electrode layer can be reduced.

A solid-state battery manufacturing method of another aspect of the present disclosure is a method that comprises:

a laminate forming step of forming a laminated structure that includes a first collector layer, a first electrode layer, a solid electrolyte layer, a second electrode layer, and a second collector layer in this order from the top; and a laser cutting step of cutting the laminated structure into a predetermined size and shape using a laser beam, one of the first electrode layer and the second electrode layer being a positive electrode layer while the other is a negative electrode layer, in the laser cutting step, the laminated structure being cut so as to satisfy $\alpha > 90°$, $\beta > 90°$, $\gamma > 90°$, $\delta \geq 90°$, and $\alpha + \gamma > \beta + \delta$, wherein:

α is an angle formed in the positive electrode layer by a side surface of the positive electrode layer and a surface in contact with the positive electrode layer of a layer underlying the positive electrode layer, and β is an angle formed in the negative electrode layer by a side surface of the negative electrode layer and a surface in contact with the negative electrode layer of a layer underlying the negative electrode layer, γ is an angle formed in the positive electrode layer by a side surface of the positive electrode layer and a surface in contact with the positive electrode layer of a layer overlying the positive electrode layer, and δ is an angle formed in the negative electrode layer by a side surface of the negative electrode layer and a surface in contact with the negative electrode layer of a layer overlying the negative electrode layer.

Since the cut shape satisfies $\beta > 90°$, the negative electrode layer has an inwardly sloped side surface toward the bottom. In this structure, the negative electrode layer, when disposed above the positive electrode layer, becomes less likely to come in contact with the positive electrode layer, and shorting between the positive electrode layer and the negative electrode layer can be reduced.

Since a laser beam is used to cut the laminated structure, the laminated structure can be cut into a shape that cannot be easily achievable by common mechanical cutting. Since the cut shape satisfies $\alpha + \gamma > \beta + \delta$, the negative electrode layer, which accepts metal ions, can have a higher volume than the positive electrode layer, and the metal ions present in the positive electrode layer become less likely to precipitate as metal on the negative electrode layer, making it possible to manufacture a solid-state battery in a way that shorting due to precipitation of metals can be reduced. Since the cut shape satisfies $\alpha > 90°$ and $\gamma > 90°$, the positive electrode layer has inwardly sloped side surfaces toward the top and bottom. In this structure, the positive electrode layer is less likely to come in contact with the negative electrode layer, regardless of whether the negative electrode layer is disposed above or below the positive electrode layer. This makes it possible to manufacture a solid-state battery in a way that shorting between the positive electrode layer and the negative electrode layer due to a reduced non-functional region can be reduced. It is accordingly possible to efficiently manufacture a solid-state battery that is highly reliable, and that, with a reduced non-functional region, has high volume energy density. Since the cut shape satisfies $\beta > 90°$, the negative electrode layer has an inwardly sloped side surface toward the bottom. In this structure, the negative electrode layer, when disposed above the positive electrode layer, becomes less likely to come in contact with the positive electrode layer, and shorting between the positive electrode layer and the negative electrode layer can be reduced.

In the solid-state battery manufacturing method, for example, the laser beam may represent a plurality of laser beams split from a single laser beam.

In this way, the laminated structure can be processed at once in the laser cutting step, making it possible to manufacture the solid-state battery even more efficiently.

Embodiments of the present disclosure are described below, with reference to the accompanying drawings.

The following specifically describes the embodiments with regard to the solid-state battery, and to the solid electrolyte layer, the positive electrode layer, and the negative electrode layer constituting the solid-state battery. The embodiments below represent a comprehensive and specific implementation. It should also be noted that the features described in the embodiments below, including numerical values, shapes, materials, constituents, the layouts and interconnections of constituents, and steps are merely examples, and are not intended to limit the present disclosure. Among the constituents described in the embodiments below, constituents not recited in the most generic, independent claims are described as being arbitrary or optional.

The drawings attached herewith are schematic views with exaggerations, omissions, or adjusted proportions, which are appropriately incorporated for the purpose of describing the present disclosure. Accordingly, the drawings are not strict representations of the present disclosure, and do not necessarily represent the actual shapes, positional relationships, and proportions. In the drawings, the same reference numerals are used to refer to substantially the same configurations, and descriptions of such common configurations may be omitted or simplified.

In the specification, languages describing relationships between elements, such as in elements being parallel to each other, languages describing shapes of elements, such as in elements being rectangular, and ranges of numerical values are not to be construed in a strict sense. For example, a given range of numerical values is inclusive of substantially the same numerical range with a difference of about several percent, and "same area" is intended to mean an area with a difference of ±5%.

As used herein, the terms "inner" and "outer" such as in "inner side" and "outermost portion" are relative to a solid-state battery viewed along a direction of lamination of layers.

As used herein, "side surface" means a side surface relative to a solid-state battery viewed along a direction of lamination of layers.

As used herein, the terms "top" and "bottom" used in conjunction with a configuration of the solid-state battery are not intended to mean up (vertically up) and down (vertically down) in an absolute sense of space recognition, but represent terms that are determined by a relative positional relationship based on the order in which layers are laminated in a layered structure. The terms "above" and "below" are used not only when describing two elements that are disposed by being separated from each other with an intervening element, but when describing two elements that are disposed in contact with each other with no space in between.

As used herein, "planar view" means a view when a solid-state battery is viewed along a direction of lamination of layers.

First Embodiment

A. Solid-State Battery

A solid-state battery according to the present embodiment is described below. FIG. 1 is a schematic view of a solid-state battery 100 of the present embodiment. FIG. 1, (a) is a top view of the solid-state battery 100. FIG. 1, (b) is a cross sectional view showing a cross section of the solid-state battery 100 at line C-C in (a) of FIG. 1.

As illustrated in (b) of FIG. 1, the solid-state battery 100 of the present embodiment is a laminate that includes a first collector layer 1, a positive electrode layer 2, a solid electrolyte layer 5, a negative electrode layer 4, and a second collector layer 3, in this order from the top. In the present embodiment, the positive electrode layer 2 represents a first electrode layer, and the negative electrode layer 4 represents a second electrode layer. In other words, the solid-state battery 100 of the present embodiment includes the first collector layer 1 formed of a metal foil or the like; the positive electrode layer 2 formed on the first collector layer 1 and containing a positive-electrode active material; the second collector layer 3 formed of a metal foil or the like; the negative electrode layer 4 formed on the second collector layer 3 and containing a negative-electrode active material; and the solid electrolyte layer 5 disposed between the positive electrode layer 2 and the negative electrode layer 4 and containing at least a solid electrolyte having ion conductivity. In the present embodiment, the first collector layer 1 represents a positive-electrode collector, which is a collector for the positive electrode layer 2, and the second collector layer 3 represents a negative-electrode collector, which is a collector for the negative electrode layer 4.

The solid-state battery 100 is structured so that the side surfaces of the first collector layer 1, the side surfaces of the second collector layer 3, and outermost portions of the side surfaces of the laminated structure of the positive electrode layer 2, the negative electrode layer 4, and the solid electrolyte layer 5 overlie one another, when viewed along a direction of lamination of these layers. As shown in FIG. 1, the first collector layer 1, the positive electrode layer 2, the solid electrolyte layer 5, the negative electrode layer 4, and the second collector layer 3 are laminated so that regions representing outermost portions of these layers have the same area, and overlie one another in planar view. The outermost portions of the positive electrode layer 2, in planar view, are where the side surfaces 2A of the positive electrode layer 2 meet contact portions 2C contacting the first collector layer 1. The outermost portions of the negative electrode layer 4, in planar view, are where the side surfaces 4A of the negative electrode layer 4 meet contact portions 4C contacting the solid electrolyte layer 5.

The solid-state battery 100 may contain a trace amount of a binder that binds at least the positive-electrode active material and the first collector layer 1 to each other, the positive-electrode active material and the solid electrolyte layer 5 to each other, the positive-electrode active materials (particles of positive-electrode active material) to each other, the negative-electrode active material and the second collector layer 3 to each other, the negative-electrode active material and the solid electrolyte layer 5 to each other, the negative-electrode active materials (particles of negative-electrode active material) to each other, and the solid electrolyte layers 5 (particles of solid electrolyte) to one another.

As shown in (b) of FIG. 1, when viewed along a direction of lamination, the side surfaces 2A of the positive electrode layer 2 are sloped so that the side surfaces of the solid electrolyte layer 5 and the first collector layer 1 lie outside of contact portions 2B, where the side surfaces 2A of the positive electrode layer 2 meet the solid electrolyte layer 5. When viewed along a direction of lamination, the side surfaces 4A of the negative electrode layer 4 are sloped so that the side surfaces of the solid electrolyte layer 5 and the second collector layer 3 lie outside of contact portions 4B, where the side surfaces 4A of the negative electrode layer 4 meet the second collector layer 3, lie on the inner side of. The side surfaces 4A of the negative electrode layer 4 may be perpendicular to the solid electrolyte layer 5 and to the second collector layer 3. As shown in (b) of FIG. 1, the positive electrode layer 2 and the negative electrode layer 4 are tapered toward the bottom, as viewed in a cross section along a direction of lamination. The solid-state battery 100 satisfies $\alpha > 90°$, $\beta \geq 90°$, and $\alpha > 0$, where $\alpha$ is the slope angle formed by the side surfaces 2A of the positive electrode layer 2 on the side of the positive electrode layer 2 in a cross section along a direction of lamination, specifically, the angle formed in the positive electrode layer 2 by the side surfaces 2A of the positive electrode layer 2 and the top surface of the solid electrolyte layer 5 directly below the positive electrode layer 2, and $\beta$ is the slope angle formed by the side surfaces 4A of the negative electrode layer 4 on the side of the negative electrode layer 4 in a cross section along a direction of lamination, specifically, the angle formed in the negative electrode layer 4 by the side surfaces 4A of the negative electrode layer 4 and the top surface of the second collector layer 3. The solid-state battery 100 also satisfies $\beta > 90°$.

In the solid-state battery 100, when viewed along a direction of lamination, the contact portions 4B, where the side surfaces 4A of the negative electrode layer 4 meet the second collector layer 3 directly below the negative electrode layer 4 lie outside of the contact portions 2B, where the side surfaces 2A of the positive electrode layer 2 meet the solid electrolyte layer 5 directly below the positive electrode layer 2. Here, when viewed along a direction of lamination, the relation a>b is satisfied, where a is the distance from the side surface of the solid electrolyte layer 5 to the contact portion 2B where the side surface 2A of the positive electrode layer 2 meets the solid electrolyte layer 5 on each side, and b is the distance from the side surface of the second collector layer 3 to the contact portion 4B where the side surface 4A of the negative electrode layer 4 meets the second collector layer 3 on each side.

Figure 2:
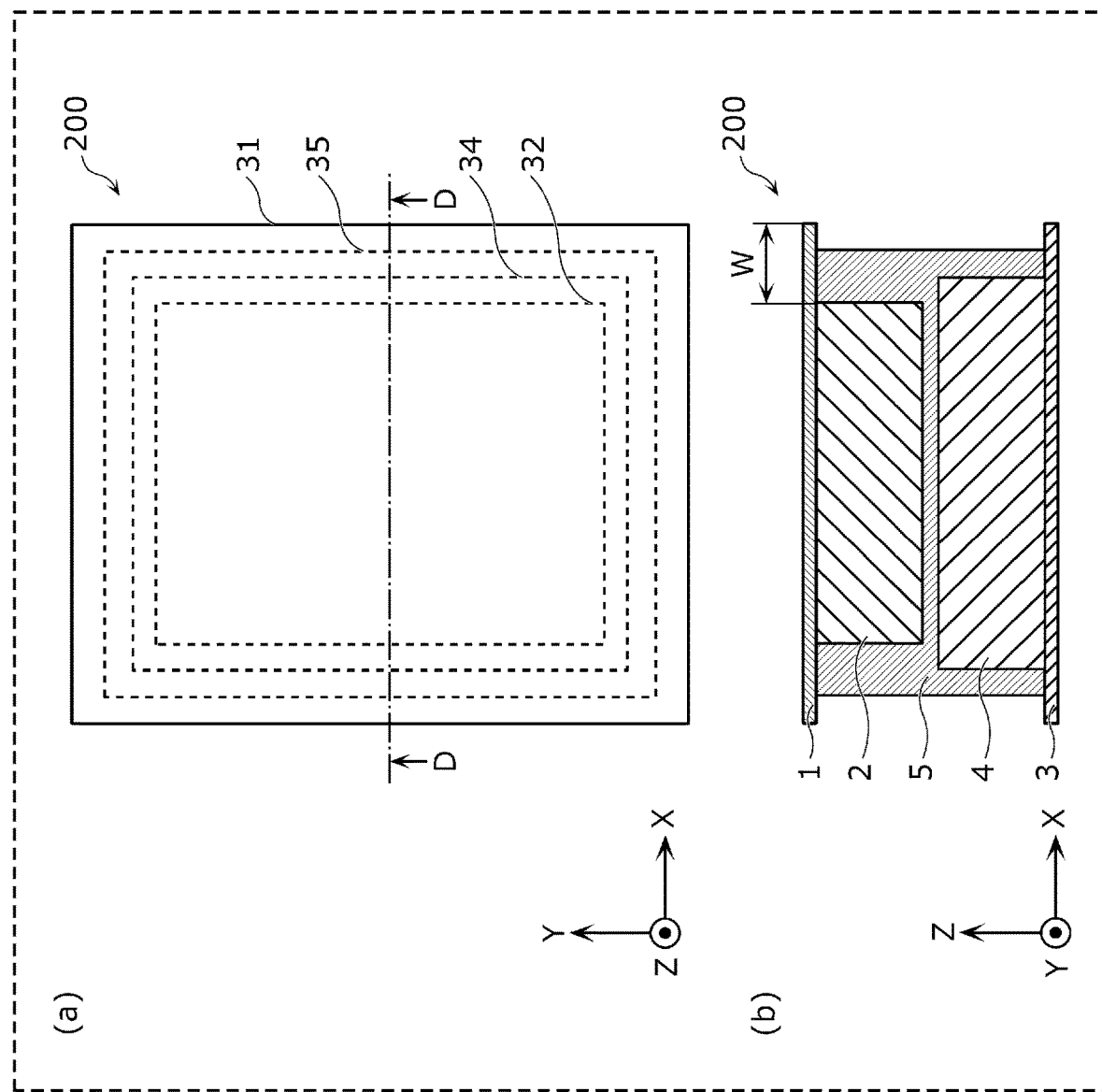
FIG. 2 is a schematic view of the solid-state battery of First Embodiment of the present disclosure, before a laser cutting step.

FIG. 2, (a) shows a top view of a solid-state battery 200 before a laser cutting step, or after a pressing step (these steps will be described later). FIG. 2, (b) is a cross sectional view showing a cross section of the solid-state battery 200 at line D-D in (a) of FIG. 2.

As illustrated in (a) of FIG. 2, before a laser cutting step, the layers constituting the solid-state battery 200 have areas that satisfy first collector layer 1=second collector layer 3≥solid electrolyte layer 5>negative electrode layer 4>positive electrode layer 2, when viewed in plan. Preferably, before a laser cutting step, the areas of the layers constituting the solid-state battery 200 satisfy first collector layer 1=second collector layer 3≥solid electrolyte layer 5>negative electrode layer 4>positive electrode layer 2, or solid electrolyte layer 5≥first collector layer 1=second collector layer 3>negative electrode layer 4>positive electrode layer 2, when viewed in plan. By having a larger area than the negative electrode layer 4 and the positive electrode layer 2 in planar view, the first collector layer 1, the second collector layer 3, and the solid electrolyte layer 5 can have overhanging side surfaces, and shorting between the positive electrode layer 2 and the negative electrode layer 4 can be reduced.

The following describes the relationship between $\alpha$ and $\beta$. As shown in FIG. 1, it is assumed here that a surface formed by the outermost portions of the positive electrode layer 2, and a surface formed by the outermost portions of the negative electrode layer 4 in planar view have shorter sides A and longer sides B, and that the positive electrode layer 2 has thickness Tp, and the negative electrode layer 4 has thickness Tn. Here, volume Vp=A×B×Tp, where Vp is the volume of when the positive electrode layer 2 is laminated in such a fashion that its side surfaces 2A are perpendicular to the solid electrolyte layer 5 without being sloped. Similarly, volume Vn=A×B×Tn, where Vn is the volume of when the negative electrode layer 4 is laminated in such a fashion that its side surfaces 4A are perpendicular to the second collector layer 3 without being sloped.

It is assumed here that the volumes and thicknesses are the same. That is, Vp=Vn, and Tp=Tn=T.

Here, $\alpha'=180-\alpha$, and $\beta'=180-\beta$.

In the solid-state battery 100, the negative electrode layer 4 should have a larger volume than the positive electrode layer 2 because this inhibits the metal ions present in the positive electrode layer from precipitating as metal from the negative electrode layer. Assume here that such a volume difference between the positive electrode layer 2 and the negative electrode layer 4 is provided by cutout volume c, which is the volume of positive electrode layer 2 removed due to the slope on the side surfaces 2A of the positive electrode layer 2, and cutout volume d, which is the volume of negative electrode layer 4 removed due to the slope on the side surfaces 4A of the negative electrode layer 4. By assuming that cutout volume c is 2% of Vp (volume %), and cutout volume d is 1% of Vn (volume %), the relationship between $\alpha$ and $\beta$ can be calculated as follows.

$$c=0.02 \times A \times B \times T = T/\tan(\alpha') \times B \times T$$

$$d=0.01 \times A \times B \times T = T/\tan(\beta') \times B \times T$$

$$2 \times \tan(\alpha') = \tan(\beta')$$

It follows from this that $\alpha'<\beta'$.

Because $180-\alpha<180-\beta$, $\alpha$ is greater than $\beta$.

Under the foregoing conditions, the solid-state battery 100, when $\alpha>\beta$, has the negative electrode layer 4 that is larger in volume than the positive electrode layer 2.

In the actual solid-state battery, the positive electrode layer 2 and the negative electrode layer 4 may have different electrical capacity densities, and there are cases where the volume ratio is deliberately varied based on an electrical capacity density ratio to achieve the same electrical capacity for the positive electrode layer 2 and the negative electrode layer 4. Here, the volume ratio of positive electrode layer 2 and negative electrode layer 4 is represented by Vn/Vp. Assume the same electrical capacity occurs when Vn/Vp≥1, though the value depends on the material used, and the type of material currently available. Accordingly, the volume ratio that provides the same electrical capacity is assumed to be Vn/Vp=1.2, not Vp=Vn. Provided that the positive electrode layer 2 and the negative electrode layer 4 have the same area in planar view, the foregoing volume ratio is achieved with the thicknesses satisfying 1.2×Tp=Tn.

In the solid-state battery 100, the negative electrode layer 4 should have a larger electrical capacity than the positive electrode layer 2 because this inhibits the metal ions present in the positive electrode layer from precipitating as metal from the negative electrode layer. In order to provide an electrical capacity difference between the positive electrode layer 2 and the negative electrode layer 4 with Vn/Vp=1.2, the relationship between $\alpha$ and $\beta$ is calculated as follows, with the cutout volume a being 2% of Vp (volume %), and the cutout volume b being 1% of Vn (volume %).

In this case, $$a=0.02 \times A \times B \times T = Tp/\tan(\alpha') \times B \times T$$

$$b=0.01 \times A \times B \times T = Tn/\tan(\beta') \times B \times T$$

$$=1.2Tp/\tan(\beta') \times B \times T$$

$$2.4 \times \tan(\alpha') = \tan(\beta')$$

$$\alpha' < \beta'$$

$$180-\alpha < 180-\beta$$

$$\alpha > \beta.$$

That is, by satisfying $\alpha>\beta$ under the foregoing conditions, the solid-state battery 100 has the negative electrode layer 4 having a larger electrical capacity than the positive electrode layer 2.

Here, the following relations are satisfied when the thickness ratio of positive electrode layer 2 and negative electrode layer 4 is N (N=negative electrode layer thickness/positive electrode layer thickness>1.0), and the cutout volume ratio of positive electrode layer 2 and negative electrode layer 4 is S (S=cutout volume of positive electrode layer/cutout volume of negative electrode layer>1.0).

$$S \times N \times \tan(\alpha') = \tan(\beta')$$

$$\tan(\beta')/\tan(\alpha') = S \times N$$

$\tan(180-\beta)/\tan(180-\alpha)=S\times N$ $\tan(\beta)/\tan(\alpha)=S\times N((S\times N)>1.0)$ It can be seen from this that the difference between α and β increases as the thickness ratio N and cutout volume ratio S increase.

As illustrated in FIG. 2, when viewed in planar view, the solid-state battery 200 before laser cutting step has region W, which is a non-functional region of battery between end portions 31 representing the outermost portions of the first collector layer 1 and the second collector layer 3, and end portions 32 representing the outermost portions of the positive electrode layer 2.

A solid-state battery produced by conventional mechanical cutting is fitted with terminals in the form shown in FIG. 2, before being housed in a casing. Accordingly, the battery housed in a casing has region W, which is a non-functional region of battery. In the present embodiment, the solid-state battery 200, before being cut, is slightly larger than a size that can be accommodated in a casing, and the peripheries of the solid-state battery 200 are cut with a laser to reduce the region W to 0.1 mm or less.

When the region W is reduced from 2.5 mm to 0.1 mm in a solid-state battery 100 measuring 200×100 mm in size, the functional volume of battery, or, battery capacity, can be increased by about 7.6%.

That is, with α>β, it is possible to conveniently produce a higher electrical capacity for the negative electrode layer than for the positive electrode layer. With α>90° and β>90°, the solid-state battery 100 can have a larger functional area, including the end portions, while reducing shorting between the positive electrode layer 2 and the negative electrode layer 4. With increased battery capacity, the volume energy density of the solid-state battery increases.

B. Solid Electrolyte Layer

The solid electrolyte layer 5 of the present embodiment is described below. The solid electrolyte layer 5 of the present embodiment contains a solid electrolyte and a binder, though not illustrated in the drawings. The binder may be a thermoplastic elastomer having a functional group introduced therein that improves adhesion strength, or may be an adhering binder such as polyvinylidene fluoride. Preferably, the binder is a binder that provides high adhesion strength between solid electrolyte particles with a functional group that improves adhesion strength by reacting and binding to the solid electrolyte. The solid electrolyte layer 5 is not required to contain a binder.

B-1. Solid Electrolyte

The solid electrolyte of the present embodiment is described below. The solid electrolyte can be broadly classified into sulfide solid electrolytes and oxide solid electrolytes. The solid electrolyte may be a sulfide solid electrolyte or an oxide solid electrolyte.

The sulfide solid electrolyte used in the present embodiment is not particularly limited, and may be, for example, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, or $Li_2S$—$P_2S_5$. For desirable lithium ion conductivity, it is preferable that the sulfide solid electrolyte contain Li, P, and S. The sulfide solid electrolytes may be used alone or in a combination of two or more. A $P_2S_5$-containing sulfide solid electrolyte is also preferred because $P_2S_5$ is highly reactive to the binder, and forms a strong bond with the binder. Here, the notation "$Li_2S$—$P_2S_5$" means a sulfide solid electrolyte of a feedstock composition containing $Li_2S$ and $P_2S_5$. The notation used for other types of solid electrolytes has the same meaning.

In the present embodiment, the sulfide solid electrolyte material is, for example, a sulfide-based glass ceramic containing $Li_2S$ and $P_2S_5$. The fractions of $Li_2S$ and $P_2S_5$ are preferably such that $Li_2S:P_2S_5$ is within a range of 70:30 to 80:20, more preferably 75:25 to 80:20 in terms of a molar ratio. These $Li_2S$-to-$P_2S_5$ ratios are preferred because it produces a high-ion-conductivity crystalline structure while maintaining the Li concentration, which affects battery characteristics. Another reason is that, with these ratios, $P_2S_5$ can be contained in amounts necessary for reaction and binding with the binder.

The oxide solid electrolyte used in the present embodiment is not particularly limited, and may be, for example, LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, or $Li_{1.5}Al_{0.5}Ge_{1.5}(PO_4)_3$. The oxide solid electrolytes may be used alone or in a combination of two or more.

B-2. Binder

The binder of the present embodiment is described below. For example, the binder of the present embodiment is a binder having a functional group introduced therein that improves adhesion strength. The binder binds solid electrolyte particles to one another as the functional group reacts with the solid electrolyte. This forms a structure in which the binder is interposed between solid electrolyte particles being bound to one another via the binder, and improves the adhesion strength between the solid electrolyte particles.

In the present embodiment, the binder is added in an amount of, for example, preferably 0.001 mass % to 5 mass %, more preferably 0.01 mass % to 3 mass %, further preferably 0.01 mass % to 1 mass %. When added in an amount of 0.001 mass % or more, the binder is able to more easily form a bond, and provide sufficient adhesion strength. With a binder content of 5 mass % or less, deterioration of battery characteristics such as charge and discharge characteristics becomes unlikely to occur, and serious deterioration of charge and discharge characteristics becomes unlikely even when changes occur in binder properties (for example, hardness, tensile strength, tensile elongation) in, for example, a low temperature region.

C. Positive Electrode Layer

The following describes the positive electrode layer 2 of the present embodiment. The positive electrode layer 2 of the present embodiment contains a solid electrolyte, a positive-electrode active material, and a binder. The positive electrode layer 2 is not required to contain a binder. When the positive electrode layer 2 is containing a binder, for example, the binder, with a functional group introduced in the binder to increase adhesion strength, binds the positive-electrode active material and the solid electrolyte to each other, the positive-electrode active material and the first collector layer 1 to each other, the solid electrolyte and the first collector layer 1 to each other, particles of positive-electrode active material to one another, and particles of solid electrolyte to one another.

The weight ratio of solid electrolyte and positive-electrode active material (solid electrolyte:positive-electrode active material) is preferably within a range of 50:50 to 5:95, more preferably 30:70 to 10:90. These ranges are preferred because it makes it easier to provide both a lithium ion conduction pathway and an electron conduction pathway in the positive electrode layer 2. The positive electrode layer 2 may contain a conductive auxiliary agent such as acetylene black or Ketjen black.

The first collector layer 1, which is a collector for the positive electrode layer 2, is formed of a metal foil or the like. The metal foil may be, for example, a metal such as SUS, aluminum, nickel, titanium, or copper.

C-1. Solid Electrolyte

The solid electrolyte is as described above, and is not described again.

C-2. Binder

The binder is as described above, and is not described again.

C-3. Positive-Electrode Active Material

The positive-electrode active material of the present embodiment is described below. The positive-electrode active material of the present embodiment is, for example, a lithium-containing transition metal oxide. Examples of the lithium-containing transition metal oxide include $LiCoO_2$, $LiNiO_2$, $LiMn_2O_4$, $LiCoPO_4$, $LiNiPO_4$, $LiFePO_4$, $LiMnPO_4$, and compounds obtained by substituting the transition metal in these compounds with one or more dissimilar elements. Examples of the compounds obtained by substituting the transition metal in the foregoing compounds with one or more dissimilar elements include known compounds such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$. The positive-electrode active materials may be used alone or in a combination of two or more.

D. Negative Electrode Layer

The following describes the negative electrode layer 4 of the present embodiment. The negative electrode layer 4 of the present embodiment contains a solid electrolyte, a negative-electrode active material, and a binder. The negative electrode layer 4 is not required to contain a binder. When the negative electrode layer 4 is containing a binder, for example, the binder, with a functional group introduced in the binder to increase adhesion strength, binds the negative-electrode active material and the solid electrolyte to each other, the negative-electrode active material and the second collector layer 3 to each other, the solid electrolyte and the second collector layer 3 to each other, particles of negative-electrode active material to each other, and particles of solid electrolyte to each other.

The weight ratio of solid electrolyte and negative-electrode active material (solid electrolyte:negative-electrode active material) is preferably within a range of 5:95 to 60:40, more preferably 30:70 to 50:50. These ranges are preferred because it makes it easier to provide both a lithium ion conduction pathway and an electron conduction pathway in the negative electrode layer 4. The negative electrode layer 4 may contain a conductive auxiliary agent such as acetylene black or Ketjen black.

The second collector layer 3, which is a collector for the negative electrode layer 4, is formed of a metal foil or the like. The metal foil may be, for example, a metal such as SUS, copper, or nickel.

D-1. Solid Electrolyte

The solid electrolyte is as described above, and is not described again.

D-2. Binder

The binder is as described above, and is not described again.

D-3. Negative-Electrode Active Material

The negative-electrode active material of the present embodiment is described below. The negative-electrode active material of the present embodiment is, for example, a known material, for example, a metal foil formed of lithium, or a metal that forms an alloy with lithium (e.g., indium, tin, and silicon); a carbon material (e.g., hard carbon, graphite; and an oxide active material such as $Li_4Ti_5O_{12}$ or $SiO_x$.

E. Device and Method for Manufacturing Solid-State Battery

A solid-state battery manufacturing method according to the present embodiment is described below. A method for manufacturing the solid-state battery 100 illustrated in FIG. 1 includes:

a laminate forming step (not illustrated) of forming a laminated structure that includes the first collector layer 1, the positive electrode layer 2, the solid electrolyte layer 5, the negative electrode layer 4, and the second collector layer 3 in this order from the top; and a laser cutting step of cutting the laminated structure into a predetermined size and shape using a laser beam.

A method for manufacturing the solid-state battery 100 may include:

a laminate forming step (not illustrated) of forming a laminated structure that includes the first collector layer 1, the positive electrode layer 2, the solid electrolyte layer 5, the negative electrode layer 4, and the second collector layer 3 in this order from the top, using a film-forming process such as coating;

a pressing step (not illustrated) of compressing the laminated structure so as to provide and adjust predetermined filling rates for the solid electrolyte layer 5, the positive electrode layer 2, and the negative electrode layer 4 formed in the laminate forming step; and a laser cutting step of cutting the compressed laminated structure to a predetermined size and shape.

The laminate forming step produces the laminated structure by forming and laminating the positive electrode layer 2 formed on the first collector layer 1 (e.g., a metal foil) and containing the positive-electrode active material; the negative electrode layer 4 formed on the second collector layer 3 (i.e., a metal foil) and containing the negative-electrode active material; and the solid electrolyte layer 5 disposed between the positive electrode layer 2 and the negative electrode layer 4 and containing a solid electrolyte having ion conductivity. The laminated structure may be obtained by using a known method. For example, each layer may be formed by coating a substrate with a slurry containing layer materials, and then the obtained layers may be laminated. However, especially in a case where the layers are formed by coating method, dimensional accuracy tends to be low, leading to the formation of the non-functional region described above.

In the pressing step, the laminate formed in the laminate forming step is compressed by pressure applied to the first collector layer 1 and the second collector layer 3 from their outer sides, which leads to the solid-state battery 200, i.e., a compressed laminated structure to be processed in the laser cutting step. After the compression, a filling rate of 60% or more and less than 100% is achieved in at least one of the solid electrolyte layer 5, the positive electrode layer 2, and the negative electrode layer 4. Such filling rate leads to the reduced number of voids in at least one of the solid electrolyte layer 5, the positive electrode layer 2, and the negative electrode layer 4, which leads to improvements in the lithium ion conductivity and in the electron conductivity and further to desirable charge and discharge characteristics. Note that "filling rate" is a percentage of total volume of materials in each layer excluding the voids present, with respect to the total volume of each layer including the voids.

In the laser cutting step, the laminated structure is cut so as to satisfy $\alpha>90°$, $\beta>90°$, and $\alpha>\beta$, where $\alpha$ is the angle formed in the positive electrode layer 2 by the side surfaces 2A of the positive electrode layer 2 and the top surface of the solid electrolyte layer 5 directly below the positive electrode layer 2, and $\beta$ is the angle formed in the negative electrode layer 4 by the side surfaces 4A of the negative electrode layer 4 and the top surface of the second collector layer 3 directly below the negative electrode layer 4. In the laser cutting step, a laser beam is used to cut the laminated structure into the required size and shape.

Figure 3:
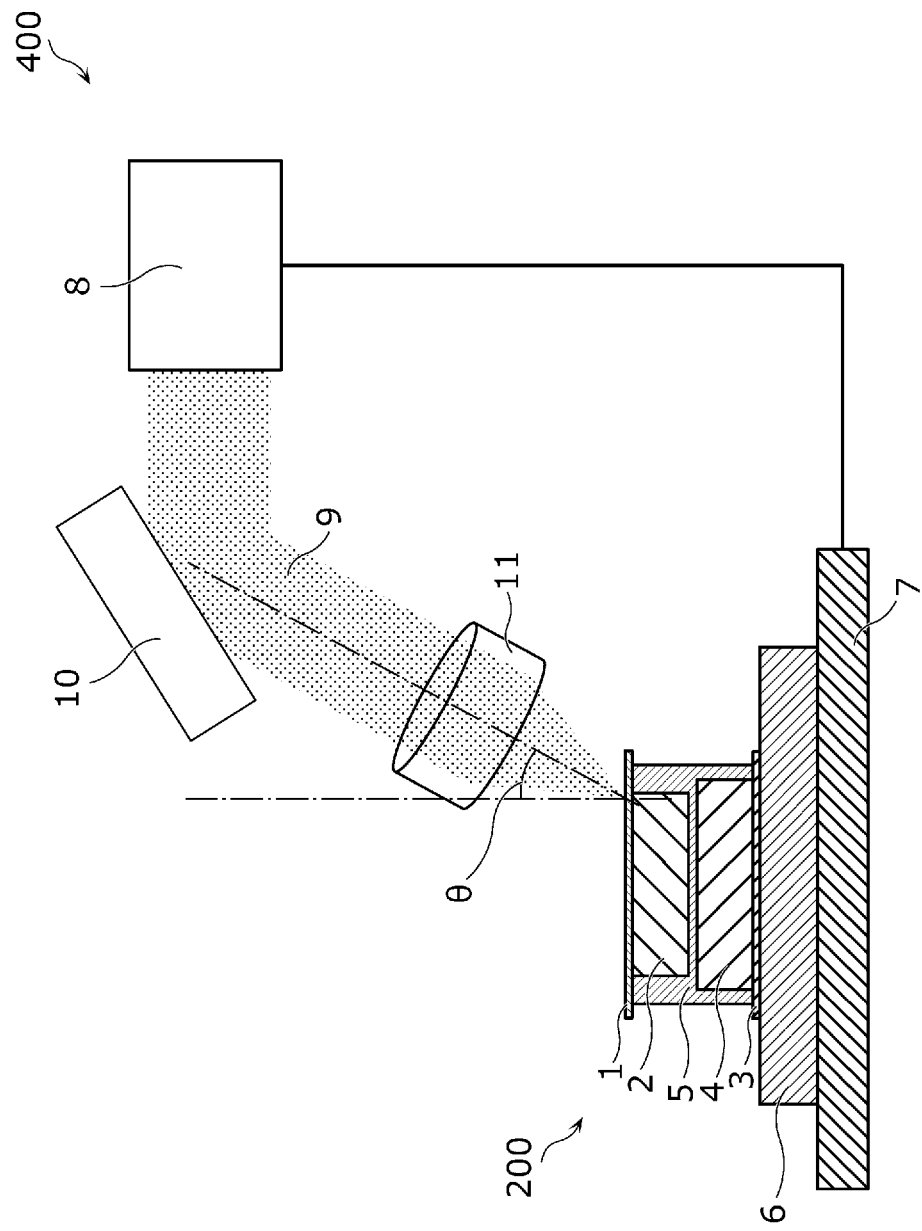
FIG. 3 is a schematic view of a cutting machine used for the solid-state battery of First Embodiment of the present disclosure.

FIG. 3 is a schematic view of a cutting machine 400 used in the solid-state battery manufacturing method of the present embodiment. FIG. 3 shows the cutting machine 400 anchoring the solid-state battery 200 before the laser cutting step.

The cutting machine 400 includes an anchoring table 6, a drive stage 7, a laser oscillator 8 that emits a laser beam 9, a mirror 10, and a lens 11.

The anchoring table 6 is provided to anchor the solid-state battery 200 by means of, for example, vacuum suction. The anchoring table 6 ensures that there is no misalignment of the solid-state battery 200 when being driven by the drive stage 7 described below.

With the drive stage 7, the anchoring table 6 mounted on the drive stage 7 can be moved in three directions, X, Y, and Z. In this way, the drive stage 7 controls a laser beam position relative to the solid-state battery 200 anchored on the anchoring table 6.

The laser oscillator 8 is a picosecond laser of a wavelength having an absorption of at least 10% by the solid-state battery 200. For example, the laser oscillator 8 is a picosecond laser having a wavelength of 1,064 nm, a pulse width of 50 ps or less, and a maximum output power of 100 W, and can emit a laser beam having a maximum repetition frequency of 1 MHz. For the laser oscillator 8, a ultrashort pulsed-laser having a pulse width of 50 ps or less is preferably used, in order to reduce degradation and unwanted shape changes due to the heat during cutting the first collector layer 1, the second collector layer 3, the positive electrode layer 2, the negative electrode layer 4, and the solid electrolyte layer 5. The laser oscillator 8 can switch ON and OFF the laser beam with control signals sent to and from the drive stage 7.

The laser beam 9, emitted by the laser oscillator 8, is a linearly-polarized-light laser beam.

The mirror 10 reflects at least 90% of the laser beam 90 emitted by the laser oscillator 8, directing the reflected laser beam to the required locations of the solid-state battery 200. That is, the mirror 10 is able to adjust the irradiation angle $\theta$ of the laser beam 9 relative to the solid-state battery 200. In the present embodiment, the mirror 10 is, for example, a dielectric multilayer mirror that reflects light of 1,064-nm wavelength.

The lens 11 condenses the parallel rays of light in the laser beam 9 onto the required locations of the solid-state battery 200. In the present embodiment, the lens 11 is, for example, a lens having a focal length of 40 mm, and that passes at least 50% of light of 1,064-nm wavelength.

Figure 4:
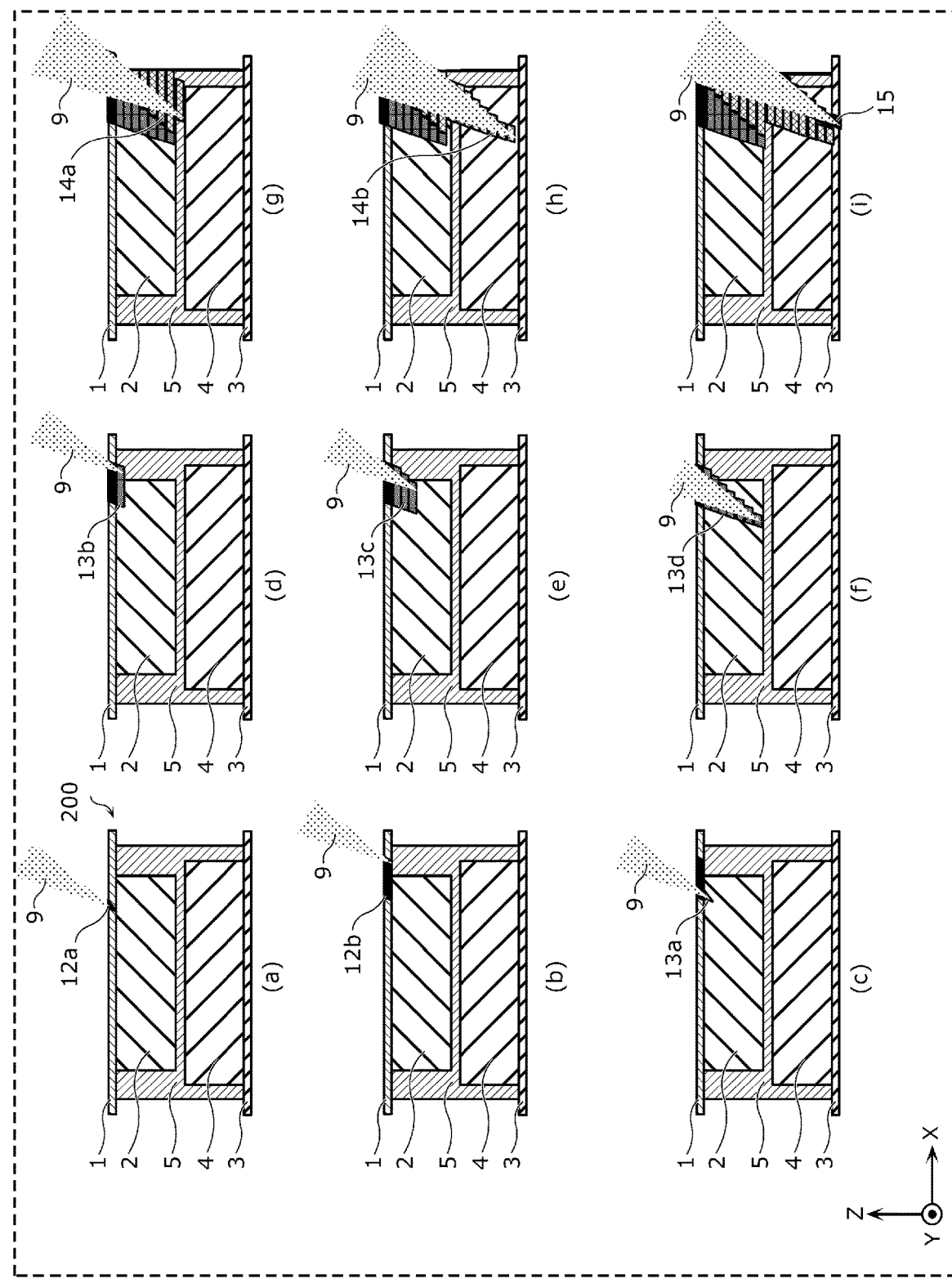
FIG. 4 is a schematic view representing an exemplary method of cutting the solid-state battery of First Embodiment of the present disclosure.

The following describes how the cutting machine 400 operates in the present embodiment, with reference to FIG. 4. FIG. 4 shows schematic views representing an example of the laser cutting process of the solid-state battery 200 subjected to the laser cutting step. FIG. 4 shows only cross sections of the solid-state battery 200, along with the laser beam 9, and does not show other components of the cutting machine 400. The laser beam 9 is emitted by the solid laser having a wavelength of 1,064 nm, a pulse width of 50 ps, and a frequency of 1 MHz, and is condensed by the lens having a focal length of 40 mm.

First, the step that removes the first collector layer 1 and the positive electrode layer 2 is described.

The laser beam 9 sets its focal point on the uppermost surface of the first collector layer 1, and scans the surface along a direction perpendicular to the plane of the paper (scans along the Y axis) to form a straight-line groove 12a in the first collector layer 1 along the Y axis (FIG. 4, (a)). The laser beam 9 then moves its focal point in an X-axis direction, and repeats the scan along a direction perpendicular to the plane of the paper (scan along the Y axis), forming a number of straight-line grooves along the Y-axis direction, and removing a portion created by these grooves as they merge along an X-axis direction. This forms a narrow removed portion 12b in the first collector layer 1 along a Y-axis direction, partly exposing the positive electrode layer 2 and the solid electrolyte layer 5 (FIG. 4, (b)). The laser beam 9 sets its focal point on the exposed portion of the positive electrode layer 2, and scans the surface in a direction perpendicular to the plane of the paper (scans along the Y axis) to form a straight-line groove 13a in the positive electrode layer 2 along the Y axis (FIG. 4, (c)). The laser beam 9 then moves its focal point in an X-axis direction, and repeats the scan along a direction perpendicular to the plane of the paper (scan along the Y axis), forming a number of straight-line grooves along the Y-axis direction, and removing a portion created by these grooves as they merge along an X-axis direction. This forms a narrow removed portion 13b in the positive electrode layer 2 and in the solid electrolyte layer 5 along a Y-axis direction (FIG. 4, (d)). The removal process is repeated by moving the focal point of the laser beams 9 in a depth direction, until layers of narrow removed portions 13c, extending along a Y-axis direction, are created (FIG. 4, (e)). This creates a removed portion 13d throughout the thickness of the positive electrode layer 2 (reaching the bottom surface of the positive electrode layer 2) (FIG. 4, (f)).

Here, the widths of the removed portions 12b, 13b, 13c, and 13d along an X-axis direction need to be wide enough not to block the laser beam 9 reaching the bottom portion of the positive electrode layer 2 (the bottom surface of positive electrode layer 2), as shown in (f) of FIG. 4. For example, in the present embodiment, work depth:width of removed portion=1:1.

The following describes the step that removes the solid electrolyte layer 5, the negative electrode layer 4, and the second collector layer 3.

As in the step that removes the positive electrode layer 2, regions of the first collector layer 1 and the positive electrode layer 2 are removed to allow for passage of the laser beam 9. First, the laser beam 9 sets its focal point on the uppermost surface of the first collector layer 1, and scans the surface in a direction perpendicular to the plane of the paper (scans along the Y axis). The laser beams 9 then moves its focal point in an X-axis direction, and repeats the scan in a direction perpendicular to the plane of the paper (scans along the Y axis), forming a number of straight-line grooves along the Y-axis direction, and removing a portion created by these grooves as they merge along an X-axis direction. This is repeated until layers of removed portions are created in a depth direction. FIG. 4, (g) shows a state after a removed portion 14a has been removed from the solid electrolyte layer 5. FIG. 4, (h) shows a state after a removed portion 14b in the negative electrode layer 4 has been removed throughout the thickness of the negative electrode layer 4 (all the way through the bottom surface of the negative electrode layer 4). FIG. 4, (i) shows a state after a removed portion 15 in the second collector layer 3 has been removed from the second collector layer 3, or a state after the completion of cutting the layers in a thickness direction.

In the foregoing descriptions, a width is ensured so that the laser beam 9 is not blocked when removing the positive electrode layer 2, the solid electrolyte layer 5, and the negative electrode layer 4 in each removal process. However, a width may be ensured such that the layers can be removed by a single removal process without blocking the laser beam 9. For example, in a case where all of the positive electrode layer 2, the solid electrolyte layer 5, and the negative electrode layer 4, the first collector layer 1 are removed by a single removal process, the first collector layer 1 needs to be removed in the width shown in (g) of FIG. 4. In this case, the first collector layer 1 may be removed over the width shown in (g) of FIG. 4 when removing the first collector layer 1 in (b) of FIG. 4.

Figure 5:
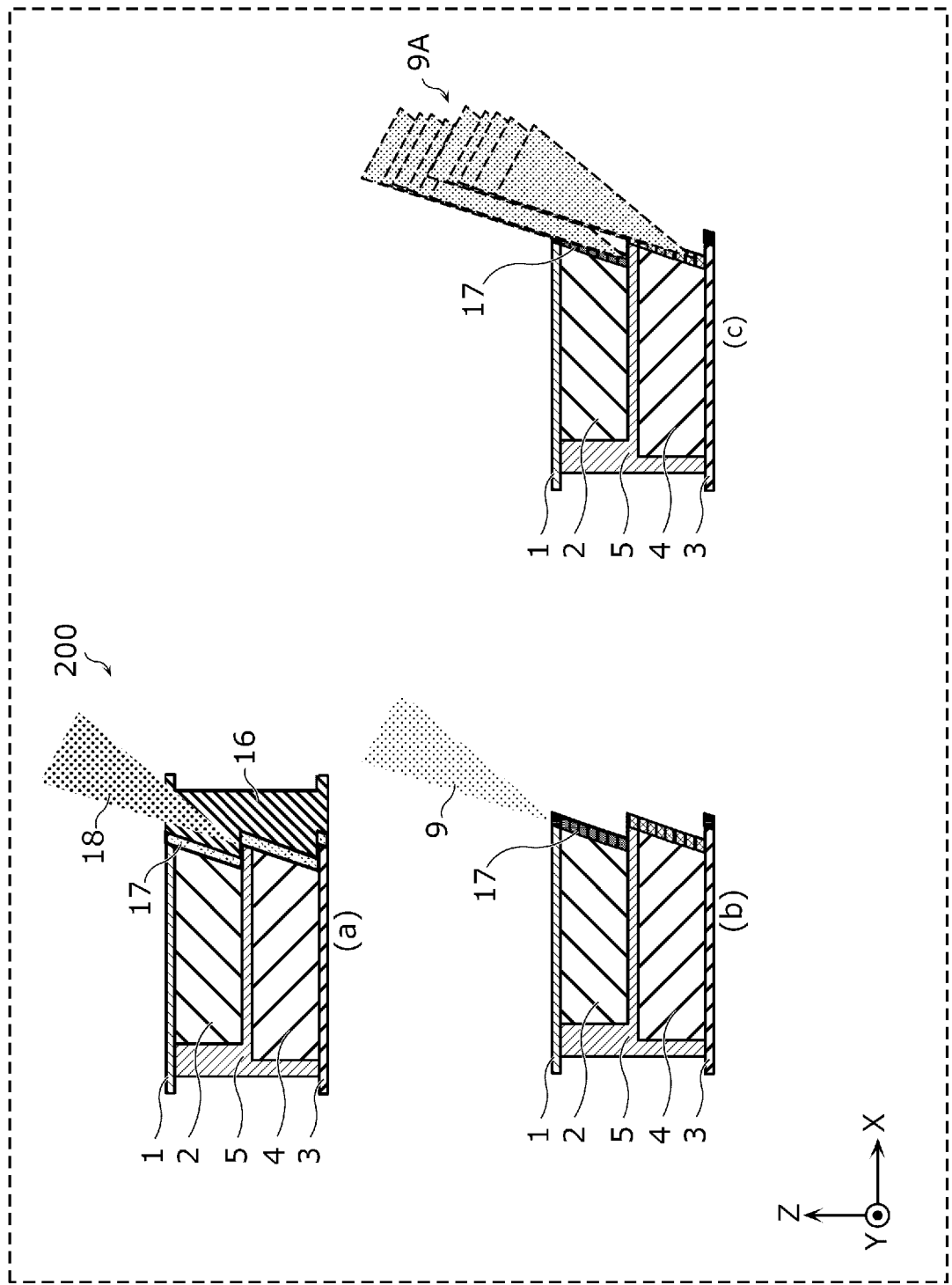
FIG. 5 is a schematic view representing an exemplary method of cutting the solid-state battery of First Embodiment of the present disclosure.

FIG. 4 represents an example of a removal process using the laser beam 9 alone. However, the laser beam used for the removal process may be a combination of different types of laser beams. FIG. 5 is a schematic view representing a process using a combination of different laser beams.

FIG. 5, (a) shows a laser beam 18, along with the solid-state battery 200 before laser cutting step. The laser beam 18, different from the laser beam 9, is emitted by a solid laser having a wavelength of 355 nm, a pulse width of 40 ps, and a frequency of 500 kHz, and is condensed with a lens having a focal length of 100 mm. The laser beam 18 has a longer pulse width than the laser beam 9, and produces a larger cutout volume than the laser beam 9. However, the laser beam 18 has poor dimensional accuracy, and the impact of the heat it produces on layers is greater than that of laser beam 9. The region 16 is a region removed by the laser beam 18, and the region 17 is a region removed by the laser beam 9. In order to prevent the laser beam 9 from being blocked in the removal process, the laser beam 18 is used to remove the region 16, which is distance away from the functional part of battery, and receives less impact on battery characteristics, for example, from the heat of the removal process (FIG. 5, (a)). This is followed by removal of the region 17, which is the boundary separating the functional part of battery from the non-functional part of battery, using the laser beam 9 (FIG. 5, (b)). This enables an efficient process while reducing deterioration of battery characteristics.

The laser beam in the laser cutting step may be a plurality of laser beams 9A split from a single laser beam, as shown in (c) of FIG. 5. Specifically, the region 17 may be removed all at once with multiple laser beams 9A that are split in X, Y, and Z directions so as to create a continuous removed portion in laser processing the layers. This enables an even more efficient process. In this case, for example, the laser beams 9A are laser beams that are split at 10-μm intervals.

The laser beams 9A can be produced by splitting the laser beam 9 with an optical element such as a beam splitter or a diffractive optical element. In the present embodiment, it is desirable to use a diffractive optical element because a beam splitter produces laser beams 9A of large beam intervals, and necessitates a selection procedure according to the beam intervals. When a diffractive optical element is used to produce the laser beams 9A, the beam intervals are determined by the optical system, and, since the process is not affected by variation in the scan, it is possible to ensure accuracy in the cut shape.

In FIG. 4, the laser beam 9 is shown to be applied from the first collector layer 1 side (from above). However, the laser beam 9 may be applied from the second collector layer 3 side (from below). When the laser beam is applied from below, because the process proceeds from lower to upper layers, layer materials evaporated due to the heat of the laser beam can be removed in the subsequent removal of the upper layer even when the evaporated material adhered to the upper layer. In this way, adhesion of evaporated material to side surfaces of the solid-state battery can be inhibited.

The laminated structure after the laser cutting step produces, for example, can be the solid-state battery 100 of the shape shown in FIG. 1. The solid-state battery 100 is fitted with terminals, and housed in a casing. Examples of the casing of the solid-state battery 100 include an aluminum laminate pouch, a SUS casing, an iron casing, an aluminum casing, and a resin casing.

Figure 6:
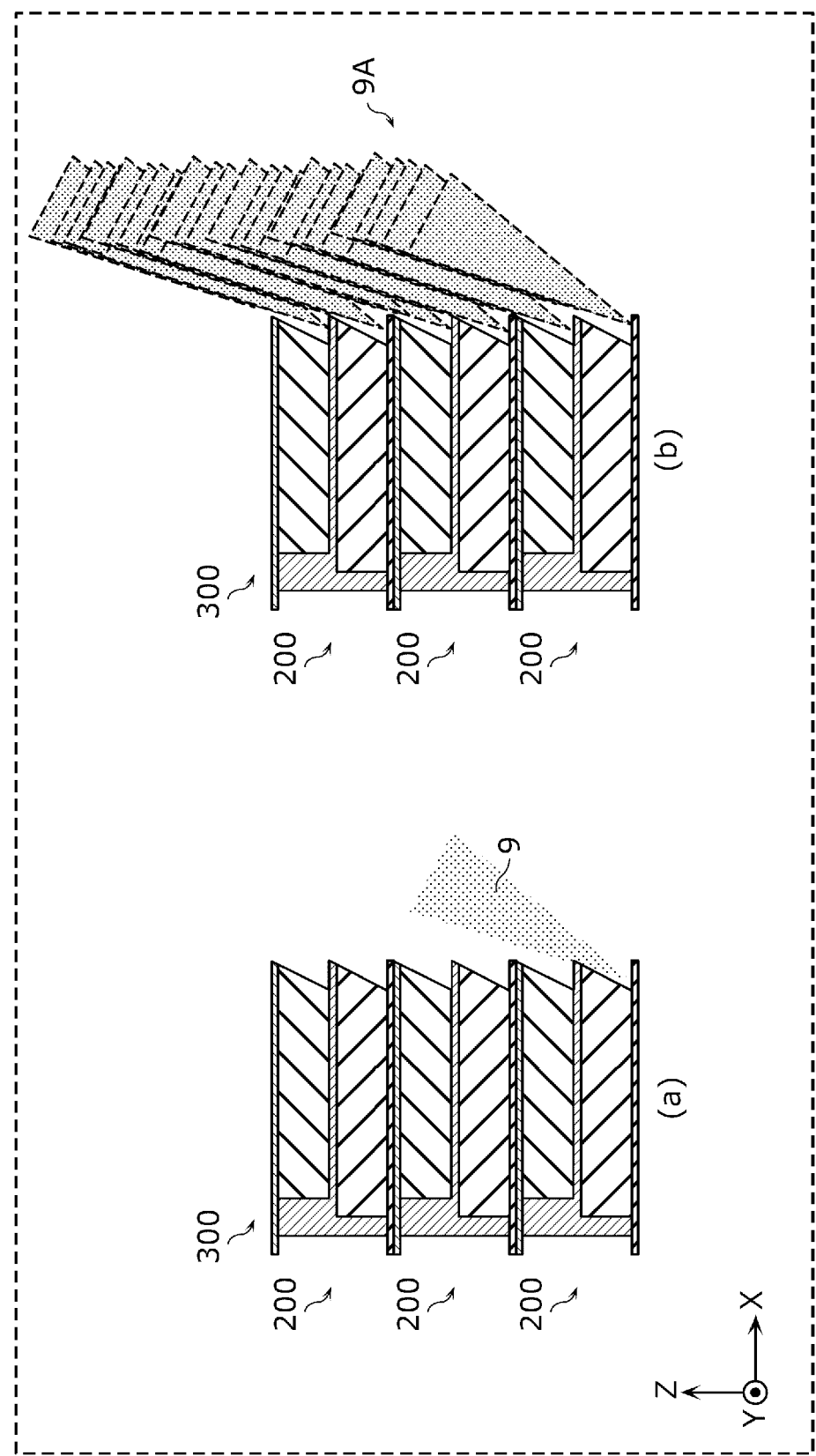
FIG. 6 is a schematic view representing an exemplary method of cutting the solid-state battery of First Embodiment of the present disclosure when the battery is stacked.

FIG. 6 is a schematic view representing a stack of a plurality of solid-state batteries 200 being simultaneously cut with a laser beam.

As shown in (a) of FIG. 6, the plurality of solid-state batteries 200 in a stack of batteries 300 may be cut and removed layer by layer with the laser beam 9. Alternatively, as shown in (b) of FIG. 6, the layers in the stack of batteries 300 may be cut and removed at once with the split laser beams 9A. By cutting multiple layers at once, misalignment as might occur between the upper and lower layers in the stack of batteries 300 can be reduced, and the stack of batteries 300 can have high dimensional accuracy.

Variation of First Embodiment

A variation of First Embodiment is described below, with reference to FIG. 7. The following descriptions of a variation focus primarily on differences from First Embodiment, and descriptions of common features are omitted or simplified.

Figure 7:
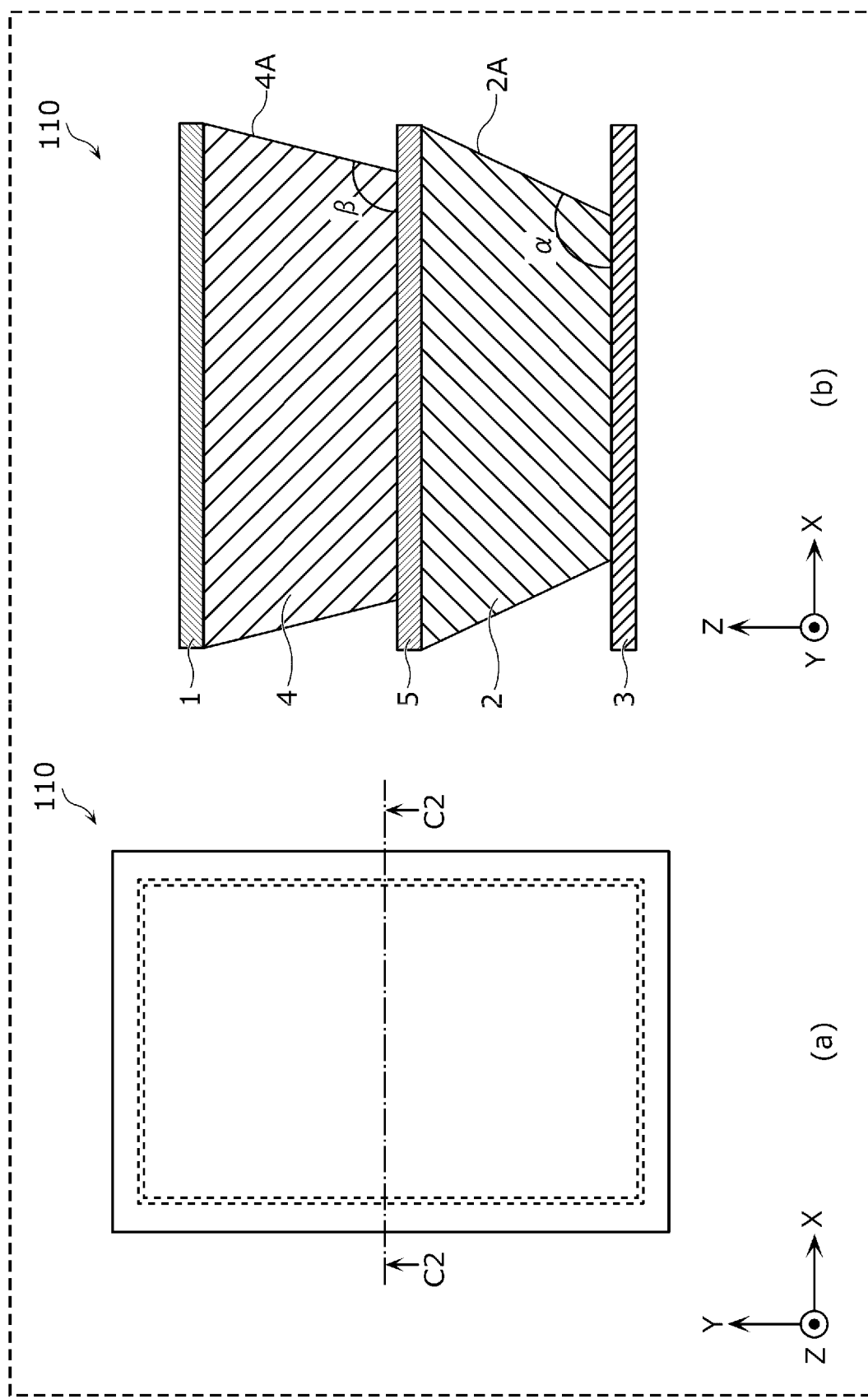
FIG. 7 is a schematic view showing a solid-state battery of a variation of First Embodiment of the present disclosure.

FIG. 7 is a schematic view of a solid-state battery 110 according to a variation of First Embodiment. FIG. 7, (a) shows a top view of the solid-state battery 110. FIG. 7, (b) is a cross sectional view showing a cross section of the solid-state battery 110 at line C2-C2 in (a) of FIG. 7.

As shown in (b) of FIG. 7, the solid-state battery 110 as a variation of First Embodiment is a laminate that includes the first collector layer 1, the negative electrode layer 4, the solid electrolyte layer 5, the positive electrode layer 2, and the second collector layer 3, in this order from the top. In the variation of First Embodiment, the negative electrode layer 4 represents a first electrode layer, and the positive electrode layer 2 represents a second electrode layer. The first collector layer 1 represents a negative-electrode collector, which is a collector for the negative electrode layer 4, and the second collector layer 3 represents a positive-electrode collector, which is a collector for the positive electrode layer 2.

As shown in (b) of FIG. 7, when viewed along a direction of lamination, the side surfaces 2A of the positive electrode layer 2 are sloped so that the side surfaces of the solid electrolyte layer 5 and the second collector layer 3 lie outside of contact portions where the side surfaces 2A of the positive electrode layer 2 meet the second collector layer 3. The side surfaces 4A of the negative electrode layer 4 are sloped so that, when viewed along a direction of lamination, the side surfaces of the solid electrolyte layer 5 and the second collector layer 3 lie outside of contact portions where the side surfaces 4A of the negative electrode layer 2 meet the solid electrolyte layer 5. The side surfaces 4A of the negative electrode layer 4 may be perpendicular to the solid electrolyte layer 5 and to the first collector layer 1. The solid-state battery 110 satisfies $\alpha>90°$, $\beta>90°$, and $\alpha>\beta$, where $\alpha$ is the slope angle formed by the side surfaces 2A of the positive electrode layer 2 on the side of the positive electrode layer 2 in a cross section along a direction of lamination, specifically, the angle formed in the positive electrode layer 2 by the side surfaces 2A of the positive electrode layer 2 and the top surface of the second collector layer 3 directly below the positive electrode layer 2, and $\beta$ is the slope angle formed by the side surfaces 4A of the negative electrode layer 4 on the side of the negative electrode layer 4 in a cross section along a direction of lamination, specifically, the angle formed in the negative electrode layer 4 by the side surfaces 4A of the negative electrode layer 4 and the top surface of the solid electrolyte layer 5.

Second Embodiment

Second Embodiment is described below. The following descriptions of Second Embodiment focus primarily on differences from First Embodiment and its variation, and descriptions of common features are omitted or simplified.

A. Solid-State Battery

Figure 8:
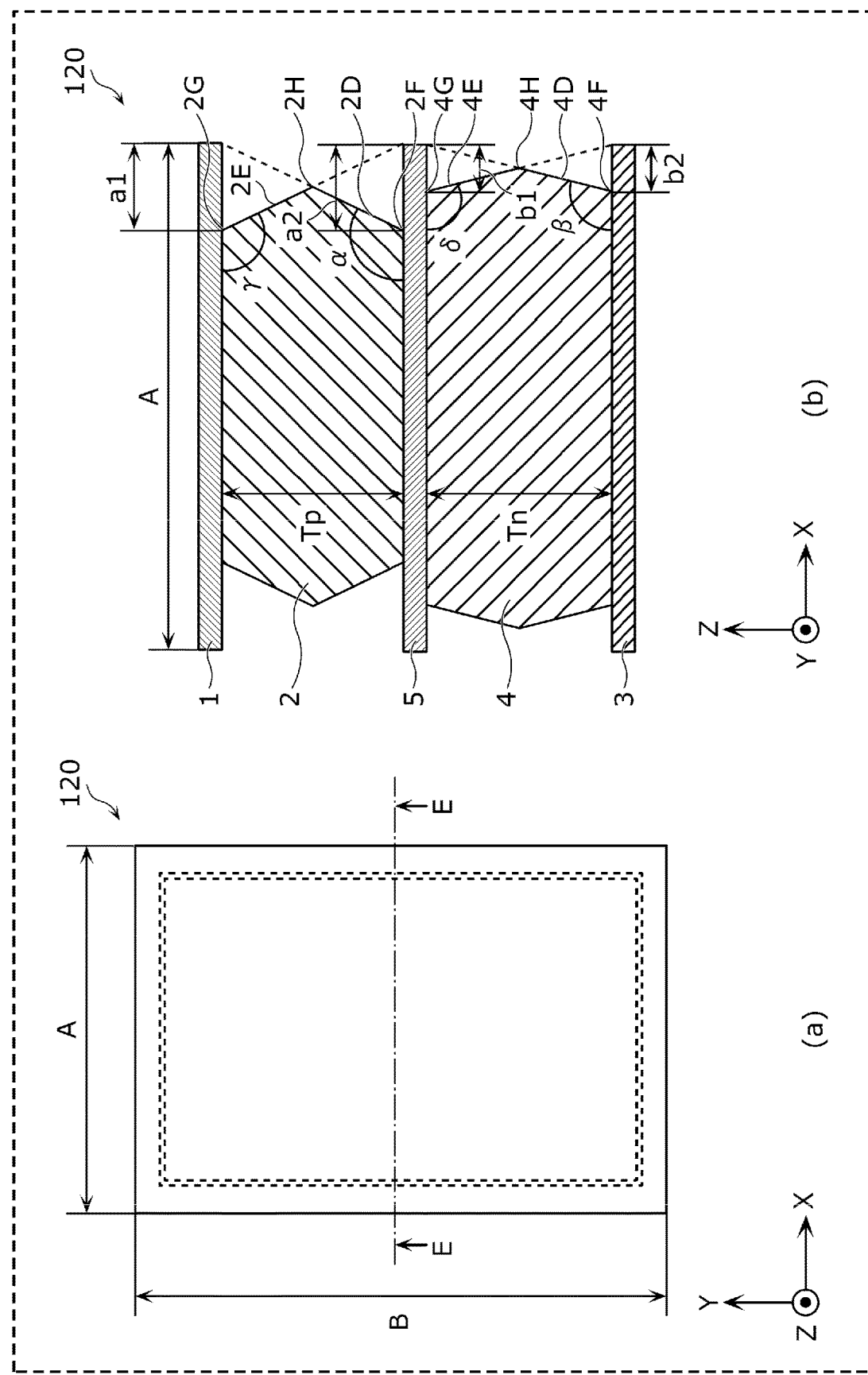
FIG. 8 is a schematic view showing a solid-state battery of Second Embodiment of the present disclosure.

FIG. 8 is a schematic view of a solid-state battery 120 of Second Embodiment. FIG. 8, (a) shows a top view of the solid-state battery 120. FIG. 8, (b) is a cross sectional view showing a cross section of the solid-state battery 120 at line E-E in (a) of FIG. 8.

As illustrated in (b) of FIG. 8, the solid-state battery 120 of Second Embodiment is a laminate that includes a first collector layer 1, a positive electrode layer 2, a solid electrolyte layer 5, a negative electrode layer 4, and a second collector layer 3, in this order from the top. In Second Embodiment, the positive electrode layer 2 represents a first electrode layer, and the negative electrode layer 4 represents a second electrode layer. The first collector layer 1 represents a positive-electrode collector, which is a collector for the positive electrode layer 2, and the second collector layer 3 represents a negative-electrode collector, which is a collector for the negative electrode layer 4.

The first collector layer 1, the solid electrolyte layer 5, and the second collector layer 3 are laminated so that regions representing outermost portions of these layers have the same area, and overlie one another in planar view. These outermost portions are also extending out beyond regions representing outermost portions of the positive electrode layer 2 and negative electrode layer 4, when viewed in plan.

The positive electrode layer 2 and the negative electrode layer 4 each have sloped side surfaces that contact the overlying and underlying layers on the collector and the solid electrolyte side. As shown in (b) of FIG. 8, the side surface 2D of the positive electrode layer 2 on the solid electrolyte layer 5 side is sloped in such a manner that, when viewed along a direction of lamination, the side surfaces of the solid electrolyte layer 5 and the first collector layer 1 lie outside of a contact portion 2F, where the side surface 2D meets the solid electrolyte layer 5. The side surface 2E of the positive electrode layer 2 on the first collector layer 1 side is sloped in such a manner that, when viewed along a direction of lamination, the side surfaces of the solid electrolyte layer 5 and the first collector layer 1 lie outside of a contact portion 2G, where the side surface 2E meets the first collector layer 1.

The side surface 4D of the negative electrode layer 4 on the second collector layer 3 side is sloped in such a manner that, when viewed along a direction of lamination, the side surfaces of the solid electrolyte layer 5 and the second collector layer 3 lie outside of a contact portion 4F, where the side surface 4D meets the second collector layer 3. The side surface 4E of the negative electrode layer 4 on the solid electrolyte layer 5 side is sloped in such a manner that, when viewed along a direction of lamination, the side surfaces of the solid electrolyte layer 5 and the second collector layer 3 lie outside of a contact portion 4G, where the side surface 4E meets the solid electrolyte layer 5. The side surface 4D of the negative electrode layer 4 on the second collector layer 3 side may be perpendicular to the second collector layer 3. The side surface 4E of the negative electrode layer 4 on the solid electrolyte layer 5 side may be perpendicular to the solid electrolyte layer 5.

In a cross section taken along a direction of lamination, the solid-state battery 120 satisfies $\alpha>90°$, $\beta>90°$, $\gamma>90°$, and $\delta\geq90°$, and satisfies at least one of (i) $\alpha>\beta$ and $\gamma>\delta$, and (ii) $\alpha+\gamma>\beta+\delta$, where $\alpha$ is the angle formed in the positive electrode layer 2 by the side surface 2D of the positive electrode layer 2 on the solid electrolyte layer 5 side, and the top surface of the solid electrolyte layer 5 directly below the positive electrode layer 2, $\beta$ is the angle formed in the negative electrode layer 4 by the side surface 4D of the negative electrode layer 4 on the second collector layer 3 side, and the top surface of the second collector layer 3 directly below the negative electrode layer 4, $\gamma$ is the angle formed in the positive electrode layer 2 by the side surface 2E of the positive electrode layer 2 on the first collector layer 1 side, and the bottom surface of the first collector layer 1 directly above the positive electrode layer 2, and $\delta$ is the angle formed in the negative electrode layer 4 by the side surface 4E of the negative electrode layer 4 on the solid electrolyte layer 5 side, and the bottom surface of the solid electrolyte layer 5 directly above the negative electrode layer 4.

The solid-state battery 120 also satisfies $\beta>90°$, and $\delta>90°$.

In the solid-state battery 120, when viewed along a direction of lamination, the contact portion 4G, where the side surface 4E of the negative electrode layer 4 meets the solid electrolyte layer 5 directly above the negative electrode layer 4 lies outside of the contact portion 2G, where the side surface 2E of the positive electrode layer 2 meets the first collector layer 1 directly above the positive electrode layer 2. In the solid-state battery 120, when viewed along a direction of lamination, the contact portion 4F and the contact portion 4G lie outside of the contact portion 2F and the contact portion 2G. Here, the contact portion 2F is where the side surface 2D of the positive electrode layer 2 meets the solid electrolyte layer 5 directly below the positive electrode layer 2, the contact portion 2G is where the side surface 2E of the positive electrode layer 2 meets the first collector layer 1 directly above the positive electrode layer 2, the contact portion 4F is where the side surface 4D of the negative electrode layer 4 meets the second collector layer 3 directly below the negative electrode layer 4, and the contact portion 4G is where the side surface 4E of the negative electrode layer 4 meets the solid electrolyte layer 5 directly above the negative electrode layer 4.

In the solid-state battery 120, when viewed along a direction of lamination, the outermost portion 4H of the side surfaces 4D and 4E of the negative electrode layer 4 lies outside of the outermost portion 2H of the side surfaces 2D and 2E of the positive electrode layer 2.

The following describes how $\alpha$, $\beta$, $\gamma$, and $\delta$ are related to one another. As shown in FIG. 8, in planar view, the distance from the contact portion 2G, where the side surface 2E of the positive electrode layer 2 on the first collector layer 1 side meets the first collector layer 1, to the side surface of the first collector layer 1 is denoted as a1, and the distance from the contact portion 2F, where the side surface 2D of the positive electrode layer 2 on the solid electrolyte layer 5 side meets the solid electrolyte layer 5, to the side surface of the solid electrolyte layer 5 is denoted as a2. Similarly, in planar view, the distance from the contact portion 4G, where the side surface 4E of the negative electrode layer 4 on the solid electrolyte layer 5 side meets the solid electrolyte layer 5, to the side surface of the solid electrolyte layer 5 is denoted as b1, and the distance from the contact portion 4F, where the side surface 4D of the negative electrode layer 4 on the second collector layer 3 side meets the second collector layer 3, to the side surface of the second collector layer 3 is denoted as b2. Desirably, in the solid-state battery 120, the negative electrode layer 4 should have a larger volume than the positive electrode layer 2, and angles $\alpha$, $\gamma$, $\beta$, and $\delta$ can have any value satisfying the foregoing conditions when a1, a2, b1, and b2 satisfy the following inequalities to provide a capacity difference between the positive electrode layer 2 and the negative electrode layer 4.

$$a1 > b1, \text{ and } a1 > b2$$

$$a2 > b1, \text{ and } a2 > b2$$

However, the solid-state battery 120 satisfies $\alpha > \beta$, and $\gamma > \delta$, and satisfies $\alpha + \gamma > \beta + \delta > 180°$, as shown in (b) of FIG. 8.

When the positive electrode layer 2 and the negative electrode layer 4 have a thickness ratio N (N=negative electrode layer thickness Tn/positive electrode layer thickness Tp>1.0), $\beta + \delta$ decreases with increasing thicknesses of the negative electrode layer 4, and the relation $\alpha + \gamma > \beta + \delta > 180°$ holds.

That is, with $\alpha$, $\beta$, $\gamma$, and $\delta$ satisfying the foregoing relations, it is possible to conveniently produce a higher electrical capacity for the negative electrode layer than for the positive electrode layer, and the solid-state battery 120 can have a larger functional area, including the end portions, while reducing shorting between the positive electrode layer 2 and the negative electrode layer 4. With increased battery capacity, the volume energy density of the solid-state battery increases.

B. Solid Electrolyte Layer

The solid electrolyte layer is as described in First Embodiment, and is not described again.

C. Positive Electrode Layer

The positive electrode layer is as described in First Embodiment, and is not described again.

D. Negative Electrode Layer

The negative electrode layer is as described in First Embodiment, and is not described again.

E. Device and Method for Manufacturing Solid-State Battery

A solid-state battery manufacturing method according to Second Embodiment is described below. The solid-state battery manufacturing method according to Second Embodiment is the same that described in First Embodiment, except for the process used in the laser cutting step. Accordingly, the following descriptions focus primarily on the laser cutting step.

The laser cutting step in the manufacturing method of Second Embodiment cuts the laminated structure in such a manner as to satisfy $\alpha > 90°$, $\beta > 90°$, $\gamma > 90°$, $\delta \geq 90°$, and $\alpha + \gamma > \beta + \delta$, where $\alpha$ is the angle formed in the positive electrode layer 2 by the side surface of the positive electrode layer 2 and the top surface of the solid electrolyte layer 5 directly below the positive electrode layer 2, $\beta$ is the angle formed in the negative electrode layer 4 by the side surface of the negative electrode layer 4 and the top surface of the second collector layer 3 directly below the negative electrode layer 4, $\gamma$ is the angle formed in the positive electrode layer 2 by the side surface of the positive electrode layer 2 and the bottom surface of the first collector layer 1 directly above the positive electrode layer 2, and $\delta$ is the angle formed in the negative electrode layer 4 by the side surface of the negative electrode layer 4 and the bottom surface of the solid electrolyte layer 5 directly above the negative electrode layer 4.

Figure 9:
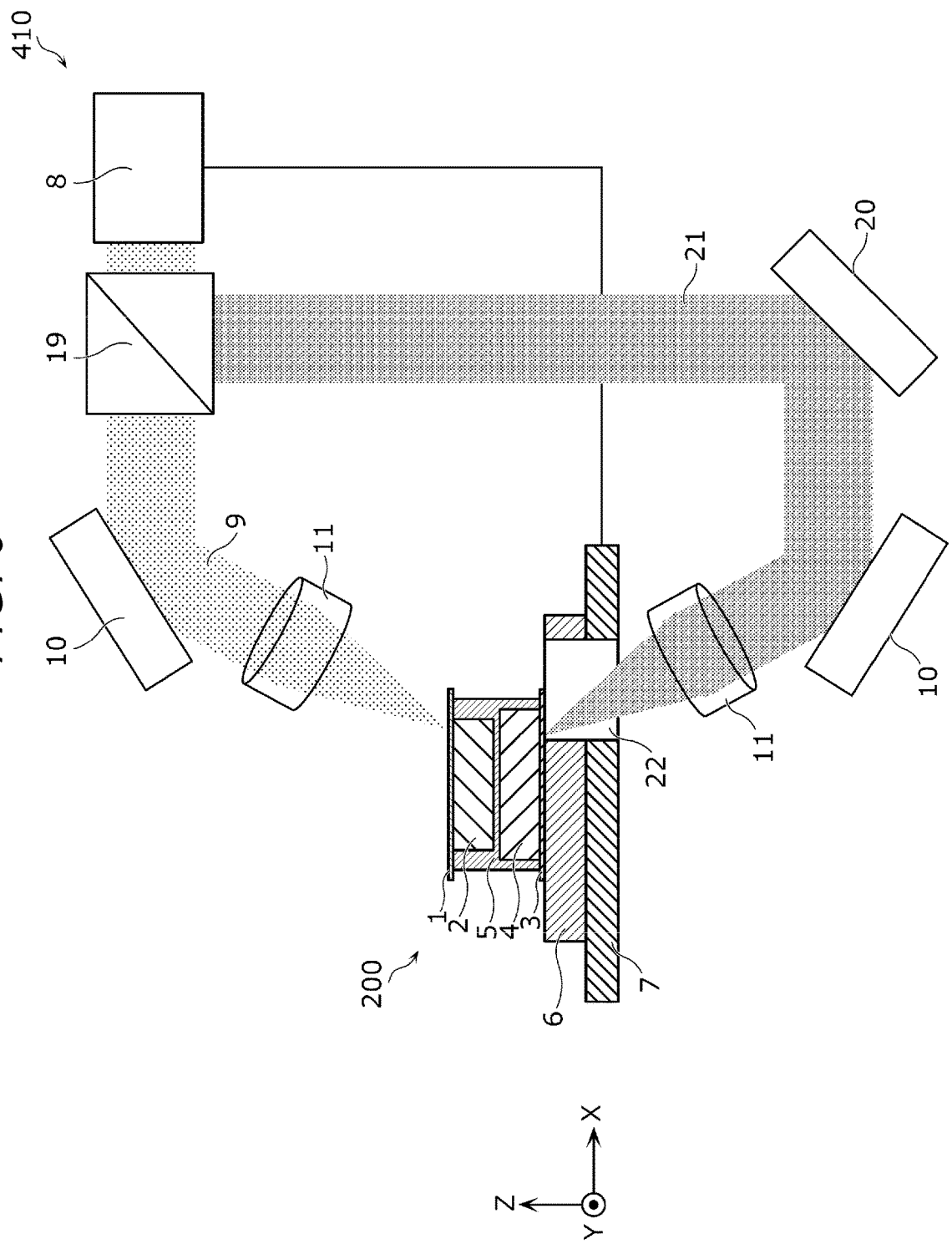
FIG. 9 is a schematic view of a cutting machine used for the solid-state battery of Second Embodiment of the present disclosure.

FIG. 9 is a schematic view showing a cutting machine 410 used in the solid-state battery manufacturing method of Second Embodiment. FIG. 9 shows the cutting machine 410 anchoring the solid-state battery 200 before laser cutting step.

The cutting machine 410 includes an anchoring table 6, a drive stage 7, a laser oscillator 8 that emits a laser beam 9, mirrors 10, lenses 11, a half mirror 19, a fold mirror 20, and a work area 22.

The half mirror 19 splits a laser beam into the laser beam 9, which falls on the positive electrode layer 2 side, and a laser beam 21, which falls on the negative electrode layer 4, in a ratio of 1:1 in terms of power.

The fold mirror 20 has a reflectance of at least 90%, and can determine the traveling path of the laser beam 21. The laser beam 21 is reflected by the fold mirror 20 and one of the mirrors 10 into the work region on the negative electrode layer 4 side of the solid-state battery 200.

The work area 22 is a hole provided through the anchoring table 6 and the drive stage 7 in a shape that conforms to the intended shape of the solid-state battery, allowing passage of the laser beam 21 through the anchoring table 6 and the drive stage 7. The work area 22 is shaped not to block the laser beam 21.

In the cutting machine 410, both the laser beam 9 and the laser beam 21 are applied to the solid-state battery 200, and, for this purpose, the cutting machine 410 includes the mirror 10 and the lens 11 in pairs.

Figure 10:
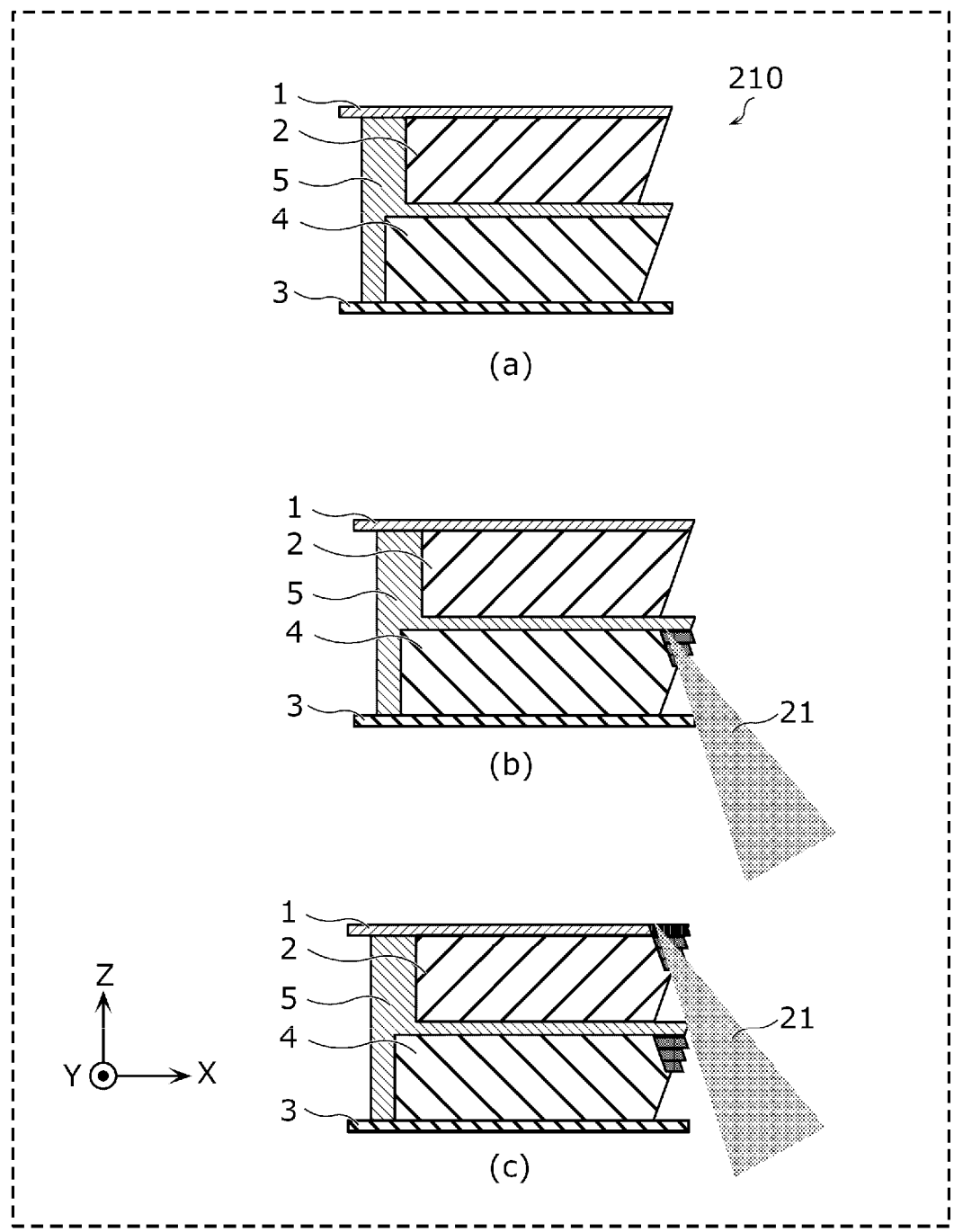
FIG. 10 is a schematic view representing an exemplary method of cutting the solid-state battery of Second Embodiment of the present disclosure.
Figure 11:
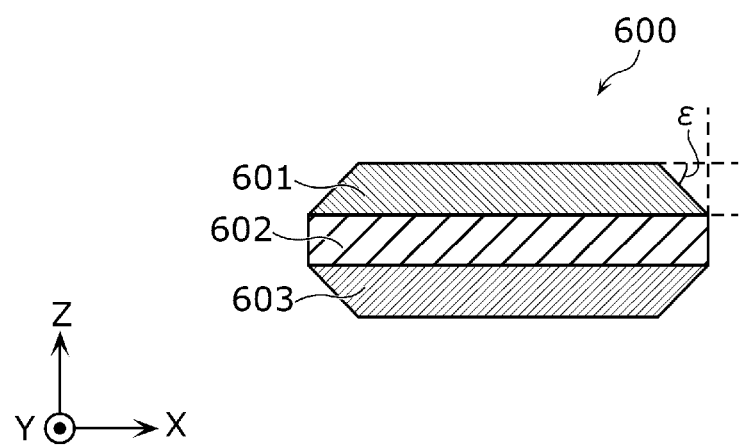
FIG. 11 is a schematic view of a solid-state battery described in JP-A-2015-50153.

The following describes how the cutting machine 410 operates in Second Embodiment, with reference to FIG. 10. FIG. 10 is a schematic view representing a laser cutting process for the solid-state battery 210 that has been cut with a laser from the first collector layer 1 side. FIG. 10 shows only cross sections of the solid-state battery 210, along with the laser beam 21, and does not show other components of the cutting machine 410.

FIG. 10, (a) shows a cross section of the solid-state battery 210 that has been cut with a laser from the first collector layer 1 side in the manner described in First Embodiment. As shown in (b) and (c) of FIG. 10, the laser beam 21 is obliquely applied from the second collector side (from the bottom), and the layers are removed in a laminar fashion in the same manner as in First Embodiment to obtain the solid-state battery 120 of the shape shown in FIG. 8.

Because the laminate is processed also from the bottom in the manufacturing method of Second Embodiment, layer materials evaporated due to the heat of the laser beam can be removed in the subsequent removal of the upper layer even when the evaporated material adhered to the upper layer. In this way, adhesion of evaporated material to side surfaces of the solid-state battery can be inhibited, as mentioned above.

As in First Embodiment, the laser beam used for the removal process in Second Embodiment may be a laser beam different from the laser beam 9 and the laser beam 21, and, for example, the laser beam 18 described in First Embodiment may be used in combination, though not illustrated in the drawings. In order to complete the removal process all at once, it is also possible to use split laser beams produced by, for example, a diffractive optical element.

Variation of Second Embodiment

As in the solid-state battery 110 of a variation of First Embodiment, a solid-state battery of a variation of Second Embodiment may be a laminate that includes the first collector layer, the negative electrode layer, the solid electrolyte layer, the positive electrode layer, and the second collector layer, in this order from the top, though not illustrated in the drawings.

Other Embodiments

While a solid-state battery of the present disclosure has been described using different embodiments, the present disclosure is not limited to the embodiments described above. Changes to the embodiments as may be conceivable by a skilled person, and embodiments based on combinations of parts of the foregoing embodiments are also intended to fall within the scope of the present disclosure, provided that such changes do not depart from the gist of the present disclosure.

For example, the laser oscillator, described as having a wavelength of 1,064 nm and a pulse width of 50 ps or less in the foregoing First and Second Embodiments, is not limited thereto, and may be modified according to the materials and the desired shape. Similarly, the lens, described as having a focal length of 40 mm in the foregoing First and Second Embodiments, may be modified according to the required accuracy and focal depth. The same effect can be obtained by using an fθ lens with a galvano scanning system.

The work accuracy can be improved when materials evaporated due to the heat of the laser beam are removed by blowing gas in the laser cutting step of First and Second Embodiments, though not illustrated in the drawings.

In First and Second Embodiments, a laser beam is used to cut the laminated structure into the predetermined size and shape. However, this may be achieved by using other cutting methods, provided that the laminated structure can be cut into the predetermined size and shape. For example, it is possible to cut the laminated structure with a blade, a drill, or ultrasonic waves.

In First and Second Embodiments, all side surfaces of the positive electrode layer and the negative electrode layer are inwardly sloped. However, the positive electrode layer and the negative electrode layer may include a side surface having no inward slope, taking into consideration the shape of the final product, and the location of an ID tag to be attached to the battery.

In First Embodiment, the side surfaces of the positive electrode layer and the negative electrode layer are inwardly sloped in a straight line, when viewed in a cross section taken along a direction of lamination. However, the side surfaces of the positive electrode layer and the negative electrode layer may have an inward slope in at least a lower portion of the side surfaces. For example, the side surfaces of the positive electrode layer and the negative electrode layer may be perpendicular to the directly overlying layer in an upper portion of the side surfaces, and only the lower portion below a central part of the side surfaces may be inwardly sloped.

In First and Second Embodiments, the solid-state battery before laser cutting step is anchored in the cutting machine for the laser cutting process. However, the laser cutting process in the laser cutting step is not limited thereto, and may be conducted by, for example, a roll-to-roll method. When using a roll-to-roll method, a laser beam may be continuously applied while rotating the rolls, or a laser beam may be applied while the rolls are stopped at certain intervals.

A solid-state battery according to the present disclosure has potential use in a wide range of battery applications, including, for example, power supplies for portable electronic devices, and on-board batteries.

What is claimed is:

1. A solid-state battery comprising a laminate that includes a first collector layer, a first electrode layer, a solid electrolyte layer, a second electrode layer, and a second collector layer, in this order from a top of the battery,
    one of the first electrode layer and the second electrode layer being a positive electrode layer while the other of the first electrode layer and the second electrode layer is a negative electrode layer,
    the solid-state battery satisfying $\alpha > 90°$, $\beta > 90°$, and $\alpha > \beta$, wherein:
    $\alpha$ is an angle formed in the positive electrode layer by a side surface of the positive electrode layer and a surface in contact with the positive electrode layer of a layer underlying the positive electrode layer, and
    $\beta$ an angle formed in the negative electrode layer by a side surface of the negative electrode layer and a surface in contact with the negative electrode layer of a layer underlying the negative electrode layer, wherein the first electrode layer is the positive electrode layer, and the second electrode layer is the negative electrode layer.

2. The solid-state battery according to claim 1, wherein, when viewed along a direction of lamination, a second contact portion where the side surface of the negative electrode layer meets the layer underlying the negative electrode layer lies outside of a first contact portion where the side surface of the positive electrode layer meets the layer underlying the positive electrode layer.

3. The solid-state battery according to claim 1, which satisfies $\gamma>90°$, $\delta\geq90°$, and $\gamma>\delta$, wherein:
   $\gamma$ is an angle formed in the positive electrode layer by the side surface of the positive electrode layer and a surface in contact with the positive electrode layer of a layer overlying the positive electrode layer, and
   $\delta$ is an angle formed in the negative electrode layer by the side surface of the negative electrode layer and a surface in contact with the negative electrode layer of a layer overlying the negative electrode layer.

4. The solid-state battery according to claim 1, wherein, when viewed along a direction of lamination, a side surface of the first collector layer, a side surface of the second collector layer, and an outermost portion of a side surface of a laminated structure of the first electrode layer, the second electrode layer, and the solid electrolyte layer overlie one another.

5. A solid-state battery comprising a laminate that includes a first collector layer, a first electrode layer, a solid electrolyte layer, a second electrode layer, and a second collector layer, in this order from a top of the battery,
   one of the first electrode layer and the second electrode layer being a positive electrode layer while the other of the first electrode layer and the second electrode layer is a negative electrode layer,
   the solid-state battery satisfying $\alpha>90°$, $\beta>90°$, $\gamma>90°$, $\delta 90°$, and $\alpha+\gamma>\beta+\delta$, wherein:
   $\alpha$ is an angle formed in the positive electrode layer by a side surface of the positive electrode layer and a surface in contact with the positive electrode layer of a layer underlying the positive electrode layer,
   $\beta$ is an angle formed in the negative electrode layer by a side surface of the negative electrode layer and a surface in contact with the negative electrode layer of a layer underlying the negative electrode layer,
   $\gamma$ is an angle formed in the positive electrode layer by the side surface of the positive electrode layer and a surface in contact with the positive electrode layer of a layer overlying the positive electrode layer, and
   $\delta$ is an angle formed in the negative electrode layer by the side surface of the negative electrode layer and a surface in contact with the negative electrode layer of a layer overlying the negative electrode layer.

6. The solid-state battery according to claim 5, wherein, when viewed along a direction of lamination, a second contact portion where the side surface of the negative electrode layer meets the layer overlying the negative electrode layer lies outside of a first contact portion where the side surface of the positive electrode layer meets the layer overlying the positive electrode layer.

7. The solid-state battery according to claim 5, wherein, when viewed along a direction of lamination, a fourth contact portion where the side surface of the negative electrode layer meets the layer underlying the negative electrode layer and a third contact portion where the side surface of the negative electrode layer meets the layer overlying the negative electrode layer both lie outside of a second contact portion where the side surface of the positive electrode layer meets the layer underlying the positive electrode layer and a first contact portion where the side surface of the positive electrode layer meets the layer overlying the positive electrode layer in a direction of lamination.

8. The solid-state battery according to claim 5, wherein, when viewed along a direction of lamination, an outermost portion of the side surface of the negative electrode layer lies outside of an outermost portion of the side surface of the positive electrode layer.

9. The solid-state battery according to claim 5, which satisfies $\delta>90°$.

* * * * *